(12) United States Patent
Sase et al.

(10) Patent No.: US 10,725,278 B2
(45) Date of Patent: *Jul. 28, 2020

(54) MICROSCOPE, OBSERVATION METHOD, AND STORAGE MEDIUM

(71) Applicant: NIKON CORPORATION, Tokyo (JP)

(72) Inventors: Ichiro Sase, Tokyo (JP); Yasutoshi Kaneko, Tokyo (JP); Tatsuo Fukui, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 96 days.

This patent is subject to a terminal disclaimer.

(21) Appl. No.: 15/991,801

(22) Filed: May 29, 2018

(65) Prior Publication Data

US 2018/0299659 A1 Oct. 18, 2018

Related U.S. Application Data

(63) Continuation of application No. PCT/JP2015/083510, filed on Nov. 27, 2015.

(51) Int. Cl.
*G02B 21/36* (2006.01)
*H04N 5/232* (2006.01)
(Continued)

(52) U.S. Cl.
CPC .......... *G02B 21/367* (2013.01); *G01N 21/64* (2013.01); *G01N 21/6458* (2013.01);
(Continued)

(58) Field of Classification Search
CPC .... G01N 21/64; G01N 21/6458; G02B 21/00; G02B 21/02; G02B 21/16; G02B 21/26;
(Continued)

(56) References Cited

U.S. PATENT DOCUMENTS 5,748,491 A * 5/1998 Allison .............. G06K 9/00503
702/190
6,259,080 B1 * 7/2001 Li ........................ G02B 21/244
250/201.2
(Continued)

FOREIGN PATENT DOCUMENTS

DE 102013106895 A1 1/2015
JP 2013-015665 A 1/2013
(Continued)

OTHER PUBLICATIONS

Jul. 4, 2019 Partial Search Report issued in European Patent Application No. 15909327.7.
(Continued)

*Primary Examiner* — Peter D Le
(74) *Attorney, Agent, or Firm* — Oliff PLC

(57) ABSTRACT

Provided is a microscope including: an illumination optical system that irradiates a specimen including a fluorescent substance with illumination light; an observation optical system including an objective lens; an imager that takes an image formed by the observation optical system; an image processor that performs image processing by using a result of the image taking; and a controller that moves at least one of a stage and the objective lens in the optical axis direction of the objective lens.

52 Claims, 29 Drawing Sheets

(51) Int. Cl.
| | |
|---|---|
| G02B 21/00 | (2006.01) |
| G01N 21/64 | (2006.01) |
| G06T 7/50 | (2017.01) |
| G06T 7/70 | (2017.01) |
| G02B 21/02 | (2006.01) |
| G02B 21/16 | (2006.01) |
| G02B 21/26 | (2006.01) |
| G06T 15/08 | (2011.01) |

(52) U.S. Cl.
CPC ............ *G02B 21/00* (2013.01); *G02B 21/02* (2013.01); *G02B 21/16* (2013.01); *G02B 21/26* (2013.01); *G02B 21/368* (2013.01); *G06T 7/50* (2017.01); *G06T 7/70* (2017.01); *G06T 15/08* (2013.01); *H04N 5/232* (2013.01); *G06T 2207/10056* (2013.01); *G06T 2207/10064* (2013.01)

(58) Field of Classification Search
CPC .... G02B 21/367; G02B 21/368; G06T 15/08; G06T 2207/10056; G06T 2207/10064; G06T 7/50; G06T 7/70; H04N 5/232
See application file for complete search history.

(56) References Cited

U.S. PATENT DOCUMENTS

| | | | | |
|---|---|---|---|---|
| 6,262,837 | B1* | 7/2001 | Nagano | G02B 21/06 359/368 |
| 6,670,602 | B1* | 12/2003 | Kohama | H01J 37/28 250/208.1 |
| 6,674,574 | B1* | 1/2004 | Aono | G02B 21/025 250/201.3 |
| 7,388,599 | B2* | 6/2008 | Maddison | G02B 21/367 348/61 |
| 8,098,279 | B2 | 1/2012 | Sase et al. | |
| 8,174,692 | B2* | 5/2012 | Hell | G01N 21/6428 356/317 |
| 8,208,202 | B2* | 6/2012 | Sase | G02B 21/0076 250/201.4 |
| 9,179,131 | B2* | 11/2015 | Foelling | G02B 27/0075 |
| 9,569,828 | B2* | 2/2017 | Munck | G01N 21/6408 |
| 2002/0043636 | A1* | 4/2002 | Kimura | G01T 1/2014 250/585 |
| 2003/0080099 | A1* | 5/2003 | Tanaka | B23K 26/0604 219/121.73 |
| 2003/0085355 | A1* | 5/2003 | Kohama | G01N 23/2251 250/310 |
| 2003/0184856 | A1* | 10/2003 | Otaki | G02B 7/28 359/383 |
| 2003/0214706 | A1* | 11/2003 | Maddison | G02B 21/244 359/368 |
| 2006/0011822 | A1* | 1/2006 | Hecht | G02B 21/0044 250/234 |
| 2006/0039064 | A1* | 2/2006 | Kawahito | G02B 7/285 359/385 |
| 2006/0060781 | A1* | 3/2006 | Watanabe | B82Y 10/00 250/310 |
| 2007/0018124 | A1* | 1/2007 | Nishi | G02B 27/0025 250/559.36 |
| 2007/0250274 | A1* | 10/2007 | Volkov | C12Q 1/6813 702/22 |
| 2008/0032414 | A1* | 2/2008 | Zhuang | G01N 21/6428 436/172 |
| 2008/0068588 | A1* | 3/2008 | Hess | G01N 21/6458 356/36 |
| 2008/0158551 | A1* | 7/2008 | Hess | G01B 9/04 356/73 |
| 2008/0173804 | A1* | 7/2008 | Indo | G01N 21/64 250/269.1 |
| 2008/0182336 | A1 | 7/2008 | Zhuang et al. | |
| 2008/0225278 | A1* | 9/2008 | Namba | G01N 21/6458 356/123 |
| 2009/0289200 | A1* | 11/2009 | Ishii | A61B 1/00009 250/459.1 |
| 2010/0054576 | A1* | 3/2010 | Tsujita | G06K 9/2018 382/134 |
| 2010/0163726 | A1* | 7/2010 | Shimada | A61B 3/12 250/306 |
| 2010/0193704 | A1* | 8/2010 | Pratt | G01J 3/4406 250/459.1 |
| 2011/0226965 | A1* | 9/2011 | Wolleschensky | G01N 21/6458 250/459.1 |
| 2013/0128025 | A1* | 5/2013 | Dyba | G01N 21/6458 348/79 |
| 2014/0133016 | A1* | 5/2014 | Matsuura | G02B 21/088 359/385 |
| 2014/0176678 | A1* | 6/2014 | Novikau | G02B 21/16 348/46 |
| 2014/0194722 | A1* | 7/2014 | Lee | A61B 8/085 600/407 |
| 2014/0339439 | A1* | 11/2014 | Ritter | G01N 21/6458 250/459.1 |
| 2014/0340482 | A1* | 11/2014 | Kanarowski | G02B 21/367 348/46 |
| 2014/0340483 | A1* | 11/2014 | Ritter | G01N 21/6458 348/46 |
| 2015/0008337 | A1* | 1/2015 | Shimizu | G01N 21/59 250/458.1 |
| 2015/0077842 | A1* | 3/2015 | Kleppe | G02B 21/0072 359/370 |
| 2015/0077843 | A1* | 3/2015 | Huhse | G02B 21/0032 359/380 |
| 2015/0085099 | A1* | 3/2015 | Kleppe | G02B 21/0064 348/80 |
| 2015/0112627 | A1* | 4/2015 | Nitta | G01N 15/1429 702/85 |
| 2015/0160446 | A1* | 6/2015 | Kalkbrenner | G01N 21/6458 250/459.1 |
| 2015/0185454 | A1* | 7/2015 | Kalkbrenner | G02B 21/0032 250/550 |
| 2016/0085062 | A1* | 3/2016 | Kalkbrenner | G02B 21/006 348/49 |
| 2016/0370570 | A1 | 12/2016 | Foelling | |

FOREIGN PATENT DOCUMENTS

| | | |
|---|---|---|
| WO | 2008/069220 A1 | 6/2008 |
| WO | 2008/091296 A2 | 7/2008 |
| WO | 2008/139799 A1 | 11/2008 |
| WO | 2012/039636 A2 | 3/2012 |

OTHER PUBLICATIONS

Feb. 23, 2016 International Search Report issued in Patent Application No. PCT/JP2015/083510.
Feb. 23, 2016 Written Opinion issued in International Patent Application No. PCT/JP2015/083510.
Dalgarno et al. "Multiplane imaging and three dimensional nanoscale particle tracking in biological microscopy." Optics Express, 2010, vol. 18, Issue 2, pp. 877-884.
Hajj et al. "Whole-cell, multicolor superresolution imaging using volumetric multifocus microscopy." Proceedings of the National Academy of Sciences of the United States of America, Dec. 9, 2014, vol. 111, No. 49 pp. 17480-17485.
Nov. 11, 2019 extended European Search Report issued in European Patent Application No. 15909327.7.
Bates, Mark et al. Stochastic Optical Reconstruction Microscopy (STORM): A Method for Superresolution Fluorescence Imaging. Cold Spring Harbor Protocol, pp. 498-520, Jun. 2013.
Depmsey, Graham. "A User's Guide to Localization-Based Super-Resolution Fluorescence Imaging". Department of Chemistry and Chemical Biology, Harvard University, Cambridge, Massachusetts, pp. 561-592, Jan. 2019.

* cited by examiner

MICROSCOPE, OBSERVATION METHOD, AND STORAGE MEDIUM

CROSS REFERENCE TO RELATED APPLICATION

This is a Continuation of PCT Application No. PCT/JP2015/083510, filed on Nov. 27, 2015. The contents of the above-mentioned application are incorporated herein by reference.

FIELD OF THE INVENTION

The present invention relates to a microscope, an observation method, and a storage medium.

BACKGROUND

One example of microscopes capable of acquiring a three-dimensional structure of a specimen to be observed is a microscope using stochastic optical reconstruction microscopy (hereinafter referred to as "STORM") (see, for example, U.S. Patent Application Publication No. 2008/0182335). STORM is used to observe a specimen with fluorescent substances. For example, STORM activates a fluorescent substance at low density and causes only the activated fluorescent substance to emit light by irradiation of excitation light, thereby acquiring a fluorescence image in which images of fluorescence are sparsely distributed. In the fluorescence image, the images of fluorescence are individually separated, and the centroid positions of the individual images are able to be determined by Gaussian fitting or the like. STORM generates (constructs) a high-resolution image by arranging point images at the centroid positions of a large number of fluorescent substances obtained from a large number of fluorescence images. For example, the structure of a specimen is able to be acquired three-dimensionally by determining the position of a fluorescent substance for each of a plurality of layers of the specimen and integrating the positions of fluorescent substances for the layers.

As described above, it is desired to match information among a plurality of layers in acquiring three-dimensional information on a specimen for each of the layers.

SUMMARY

A first aspect of the present invention provides a microscope including: an illumination optical system that irradiates a specimen including a fluorescent substance with illumination light; an observation optical system that includes an objective lens and forms an image of light from the specimen; an imager that takes the image formed by the observation optical system; an image processor that performs image processing by using a result of the image taking; and a controller that moves at least one of a stage to hold the specimen and the objective lens in a same direction as an optical axis of the objective lens. The image processor uses position information on the fluorescent substance in at least a part of an overlapping region between a first region and a second region from position information on the fluorescent substance in the first region obtained from an imaging result when a focus position of the objective lens is located at a first position and position information on the fluorescent substance in the second region obtained from an imaging result when the focus position of the objective lens is located at a second position, to correct the position information on the fluorescent substance in the second region.

A second aspect of the present invention provides a microscope including: an illumination optical system that illuminates a specimen with activation light to activate a part of a fluorescent substance included in the specimen and excitation light to excite at least a part of the activated fluorescent substance; an observation optical system that includes: an objective lens; and an astigmatic optical system that generates astigmatism for at least a part of light from the specimen, and forms an image of light from the specimen; an imager that takes the image formed by the observation optical system; an image processor that performs image processing by using a result of the image taking; and a controller that moves at least one of a stage to hold the specimen and the objective lens in a same direction as an optical axis of the objective lens. The image processor calculates position information on the fluorescent substance in a first region by using information related to the astigmatism included in an imaging result obtained when a focus position of the objective lens is located, at a first position; calculates position information on the fluorescent substance in a second region by using information related to the astigmatism included in an imaging result obtained when the focus position of the objective lens is located at a second position; and corrects the position information on the fluorescent substance in the second region by using position information on the fluorescent substance in at least a part of an overlapping region between the first region and the second region from the position information on the fluorescent substance in the first region and the position information on the fluorescent substance in the second region.

A third aspect of the present invention provides a microscope including: an illumination optical system that irradiates an object placed on a stage with illumination light; an observation optical system that includes an objective lens and forms an image of light from the specimen; an imager that takes the image formed by the observation optical system; an image processor that performs image processing by using a result of the image taking; and a controller that moves at least one of the stage and the objective lens in a same direction as an optical axis of the objective lens. The image processor uses information on the object in at least a part of an overlapping region between a first region and a second region from information on the object in the first region obtained from an imaging result when a focus position of the objective lens is located at a first position and information on the object in the second region obtained from an imaging result when the focus position of the objective lens is located at a second position, to correct the information on the object in the second region.

A fourth aspect of the present invention provides an observation method including: irradiating a specimen including a fluorescent substance with illumination light; forming, by an observation optical system including an objective lens, an image of light from the specimen; taking the image formed by the observation optical system; performing image processing by using a result of the image taking; and moving at least one of a stage to hold the specimen and the objective lens in a same direction as an optical axis of the objective lens. The image processing includes using position information on the fluorescent substance in at least a part of an overlapping region between a first region and a second region from position information on the fluorescent substance in the first region obtained from an imaging result when a focus position of the objective lens is located at a first position and position information on the fluorescent substance in the second region obtained from an imaging result when the focus position of the objective lens is located at a second position, to correct the position information on the fluorescent substance in the second region.

A fifth aspect of the present invention provides an observation method including: illuminating a specimen with activation light to activate a part of a fluorescent substance included in the specimen and excitation light to excite at least a part of the activated fluorescent substance; forming, by an observation optical system including an objective lens and an astigmatic optical system that generates astigmatism for at least a part of light from the specimen, an image of light from the specimen; taking the image formed by the observation optical system; performing image processing by using a result of the image taking; and moving at least one of a stage to hold the specimen and the objective lens in a same direction as an optical axis of the objective lens. The image processing includes: calculating position information on the fluorescent substance in a first region by using information related to the astigmatism included in an imaging result obtained when a focus position of the objective lens is located at a first position; calculating position information on the fluorescent substance in a second region by using information related to the astigmatism included in an imaging result obtained when the focus position of the objective lens is located at a second position; and correcting the position information on the fluorescent substance in the second region by using position information on the fluorescent substance in at least a part of an overlapping region between the first region and the second region from the position information on the fluorescent substance in the first region and the position information on the fluorescent substance in the second region.

A sixth aspect of the present invention provides an observation method including: irradiating an object placed on a stage with illumination light; forming, by an observation optical system including an objective lens, an image of light from the specimen; taking the image formed by the observation optical system; performing image processing by using a result of the image taking; and moving at least one of the stage and the objective lens in a same direction as an optical axis of the objective lens. The image processing includes using information on the object in at least a part of an overlapping region between a first region and a second region from information on the object in the first region obtained from an imaging result when a focus position of the objective lens is located at a first position and information on the object in the second region obtained from an imaging result when the focus position of the objective lens is located at a second position, to correct the information on the object in the second region.

A seventh aspect of the present invention provides a storage medium storing therein an image processing program causing a computer to execute image processing by using an imaging result obtained by irradiating a specimen including a fluorescent substance with illumination light, forming, by an observation optical system including an objective lens, an image of light from the specimen, moving at least one of a stage to hold the specimen and the objective lens in a same direction as an optical axis of the objective lens, and taking the image formed by the observation optical system. The image processing includes using position information on the fluorescent substance in at least a part of an overlapping region between a first region and a second region from position information on the fluorescent substance in the first region obtained from an imaging result when a focus position of the objective lens is located at a first position and position information on the fluorescent substance in the second region obtained from an imaging result when the focus position of the objective lens is located at a second position, to correct the position information on the fluorescent substance in the second region.

An eighth aspect of the present invention provides a storage medium storing therein an image processing program causing a computer to execute image processing by using an imaging result obtained by illuminating a specimen with activation light to activate a part of a fluorescent substance included in the specimen and excitation light to excite at least a part of the activated fluorescent substance, forming, by an observation optical system including an objective lens and an astigmatic optical system that generates astigmatism for at least a part of light from the specimen, an image of light from the specimen, moving at least one of a stage to hold the specimen and the objective lens in a same direction as an optical axis of the objective lens, and taking the image formed by the observation optical system. The image processing includes: calculating position information on the fluorescent substance in a first region by using information related to the astigmatism included in an imaging result obtained when a focus position of the objective lens is located at a first position; calculating position information on the fluorescent substance in a second region by using information related to the astigmatism included in an imaging result obtained when the focus position of the objective lens is located at a second position; and correcting the position information on the fluorescent substance in the second region by using position information on the fluorescent substance in at least a part of an overlapping region between the first region and the second region from the position information on the fluorescent substance in the first region and the position information on the fluorescent substance in the second region.

A ninth aspect of the present invention provides storage medium storing therein an image processing program causing a computer to execute image processing by using an imaging result obtained by irradiating an object placed on a stage with illumination light, forming, by an observation optical system including an objective lens, an image of light from the specimen, moving at least one of the stage and the objective lens in a same direction as an optical axis of the objective lens, and taking the image formed by the observation optical system. The image processing includes using information on the object in at least a part of an overlapping region between a first region and a second region from information on the object in the first region obtained from an imaging result when a focus position of the objective lens is located at a first position and information on the object in the second region obtained from an imaging result when the focus position of the objective lens is located at a second position, to correct the information on the object in the second region.

DETAILED DESCRIPTION OF EMBODIMENTS

First Embodiment

The following describes a first embodiment. A microscope according to the embodiment is, for example, a microscope using single-molecule localization microscopy, such as STORM and PALM. A microscope 1 is usable for both fluorescence observation of a specimen labeled with one kind of fluorescent substance and fluorescence observation of a specimen labeled with two or more kinds of fluorescent substances. In the first embodiment, the number of kinds of fluorescent substances (for example, reporter dyes) used for labelling is one. The microscope 1 is able to generate three-dimensional super-resolution images. For example, the microscope 1 has a mode to generate a two-dimensional super-resolution image and a mode to generate a three-dimensional super-resolution image, and is able to switch the two modes.

The specimen may be the one that contains a live cell, the one that contains a cell fixed by a tissue fixing solution, such as a formaldehyde solution, or a tissue. A fluorescent substance may be a fluorescent dye such as a cyanine dye or a fluorescent protein. The fluorescent dye includes a reporter dye that emits fluorescence when irradiated with excitation light in a state of being activated (hereinafter referred to as "activated state"). The fluorescent dye may include an activator dye that activates the reporter dye when irradiated with activation light. When the fluorescent dye does not contain the activator dye, the reporter dye becomes activated when irradiated with the activation light. The fluorescent dye is a dye pair, for example, in which two types of cyanine dye are combined with each other, examples of the dye pair including a Cy3-Cy5 dye pair (Cy3 and Cy5 are registered trademarks), a Cy2-Cy5 dye pair (Cy2 and Cy5 are registered trademarks), a Cy3-Alexa Fluor 647 dye pair (Cy3 and Alexa Fluor are registered trademarks), and a single type of dye, such as Alexa Fluor 647 (Alexa Fluor is a registered trademark). The fluorescent protein is PA-GFP or Dronpa, for example.

Figure 1:
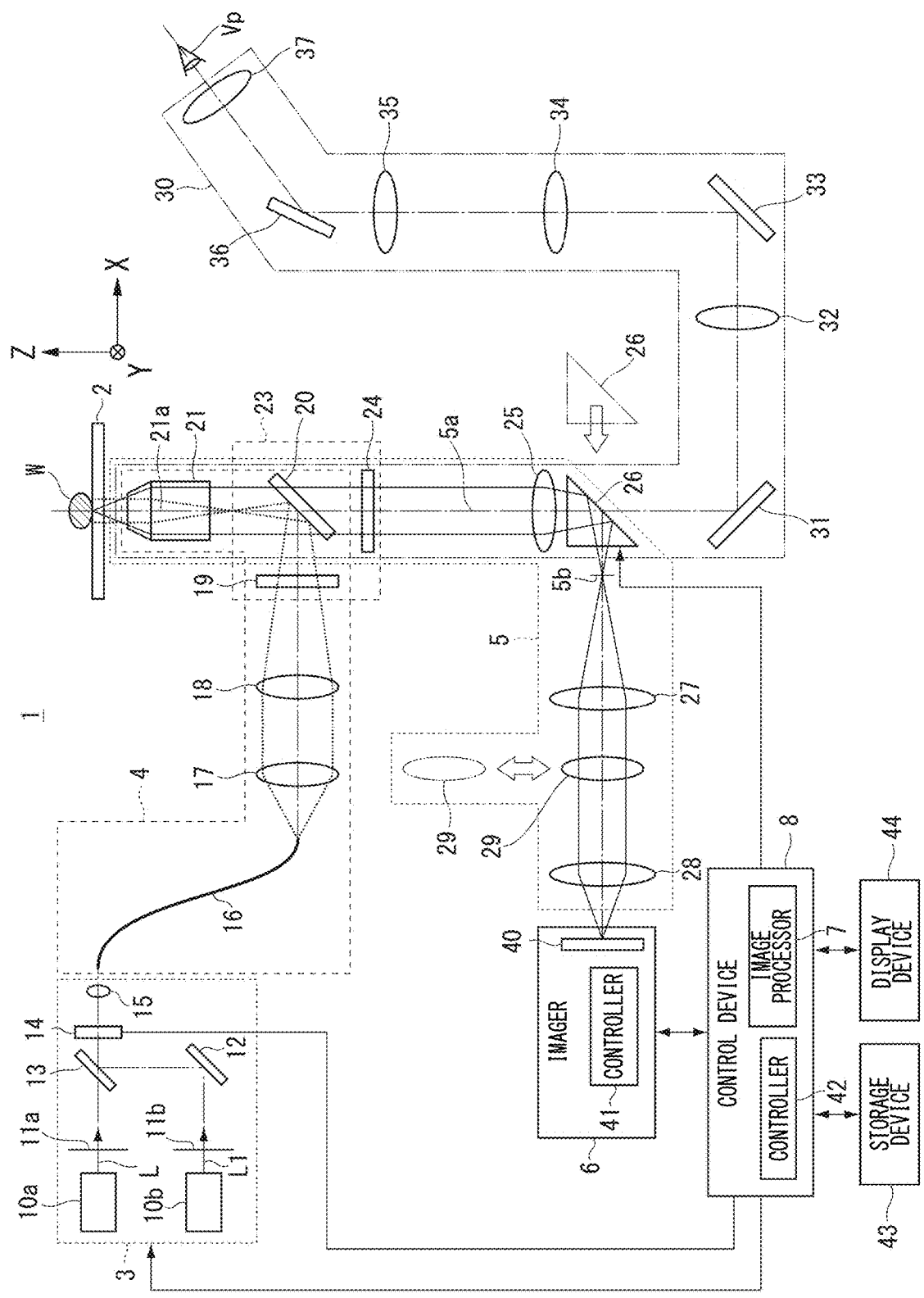
FIG. 1 is a diagram illustrating a microscope according to a first embodiment.

FIG. 1 is a diagram illustrating a microscope 1 according to the first embodiment. The microscope 1 includes a stage 2, a light source device 3, an illumination optical system 4, a first observation optical system 5, an imager 6, an image processor 7, and a control device 8. The control device 8 includes a controller 42 that comprehensively controls the parts in the microscope 1. The image processor 7 is provided in the control device 8, for example.

The stage 2 holds a specimen W to be observed. For example, the stage 2 is able to place the specimen W on its top surface. For example, the stage 2 may have a mechanism that moves the specimen W, such as an XY stage, and is not necessarily required to have a mechanism that moves the specimen W, such as a desk. The microscope 1 is not necessarily required to include the stage 2.

The light source device 3 includes an activation light source 10a, an excitation light source 10b, a shutter 11a, and a shutter 11b. The activation light source 10a emits activation light L to activate a part of a fluorescent substance included in the specimen W. It is assumed here that the fluorescent substance contains a reporter dye and does not contain an activator dye. When irradiated with the activation light L, the reporter dye in the fluorescent substance becomes an activated state capable of emitting fluorescence. The fluorescent substance may contain a reporter dye and an activator dye. In this case, when receiving the activation light L, the activator dye activates the reporter dye. The fluorescent substance may be a fluorescent protein such as PA-GFP and Dronma, for example.

The excitation light source 10b emits excitation light L1 to excite at least a part of a fluorescent substance activated in the specimen W. When irradiated with the excitation light L1 in the state of being activated, the fluorescent substance emits fluorescence or becomes inactivated. When irradiated with the activation light L in the state of being inactivated (hereinafter referred to as "inactivated state"), the fluorescent substance becomes activated state again.

The activation light source 10a and the excitation light source 10b include solid-state light sources such as laser light sources, for example, and each emit laser light having a wavelength corresponding to the type of fluorescent substance. For example, the emission wavelength of the activation light source 10a and the emission wavelength of the excitation light source 10b are selected from about 405 nm, about 457 nm, about 488 nm, about 532 nm, about 561 nm, about 640 nm, and about 647 nm. In this case, the emission wavelength of the activation light source 10a is about 405 nm, and the emission wavelength of the excitation light source 10b is selected from about 488 nm, about 561 nm, and about 647 nm.

The shutter 11a is controlled by the controller 42, and is able to switch between the state in which the activation light L from the activation light source 10a is allowed to pass and the state in which the activation light L is blocked. The shutter 1ib is controlled by the controller 42, and is able to switch between the state in which the excitation light L1 from the excitation light source 10b is allowed to pass and the state in Which the excitation light L1 is blocked.

The light source device 3 includes a mirror 12, dichroic mirror 13, an acousto-optic element 14, and a lens 15. For example, the mirror 12 is provided on the exit side of the excitation light source 10b. The excitation light L1 from the excitation light source 10b is reflected by the mirror 12 to enter the dichroic mirror 13. For example, the dichroic mirror 13 is provided on the exit side of the activation light source 10a. The dichroic mirror 13 has characteristics that transmit the activation light L and reflect, the excitation light L1. The activation light L that has transmitted through the dichroic mirror 13 and the excitation light L1 that has been reflected by the dichroic mirror 13 enter the acousto-optic element 14 through the same optical path. For example, the acousto-optic element 14 is an acousto-optic filter. The acousto-optic element 14 is controlled by the controller 42, and is able to adjust the light intensity of the activation light L and the light intensity of the excitation light L1. The acousto-optic element 14 is controlled by the controller 42, and is able to switch the states of the activation light L and the excitation light L1 between the state in which the light passes through the acousto-optic element 14 (hereinafter referred to as "light passing state") and the state in which the light is blocked or its intensity is reduced by the acousto-optic element 14 (hereinafter referred to as "light blocking state"). For example, when a fluorescent substance contains a reporter dye and does not contain an activator dye, the controller controls the acousto-optic element 14 to irradiate a specimen with the activation light L and the excitation light L1 simultaneously. When a fluorescent substance contains a reporter dye and an activator dye, for example, the controller 42 controls the acousto-optic element 14 to irradiate a specimen with the activation light L and then the excitation light L1. The lens 15 is a coupler, for example, and condenses the activation light L and the excitation light L1 from the acousto-optic element 14 onto a light guide member 16.

Note that the microscope 1 does not necessarily include at least a part of the light source device 3. For example, the light source device 3 may be unitized and provided in the microscope 1 in a replaceable (attachable, detachable) manner. For example, the light source device 3 may be attached to the microscope 1 when the microscope 1 is used for observation.

The illumination optical system 4 emits the activation light L to activate a part of fluorescent substances included in the specimen W and the excitation light L1 to excite at least a part of activated fluorescent substances. The illumination optical system 4 irradiates the specimen W with the activation light L and the excitation light L1 from the light source device 3. The illumination optical system 4 includes the light guide member 16, a lens 17, a lens 18, a filter 19, a dichroic mirror 20, and an objective lens 21.

The light guide member 16 is an optical fiber, for example, and guides the activation light L and the excitation light L1 to the lens 17. In FIG. 1 and other figures, an optical path from an exit end of the light guide member 16 to the specimen W is indicated by dotted lines. The lens 17 is a collimator, for example, and converts the activation light L and the excitation light L1 into parallel light. For example, the lens 18 condenses the activation light L and the excitation light L1 to the position of a pupil plane of the objective lens 21. For example, the filter 19 has characteristics that transmit the activation light L and the excitation light L1 and block at least a part of light beams having other wavelengths. The dichroic mirror 20 has characteristics that reflect the activation light L and the excitation light L1 and transmit light (for example, fluorescence) in a predetermined wavelength band among light beams from the specimen W. Light from the filter 19 is reflected by the dichroic mirror 20 to enter the objective lens 21. The specimen w is disposed on a front focus plane of the objective lens 21 for observation.

The above-mentioned illumination optical system 4 irradiates specimen W with the activation light L and the excitation light L1. The above-mentioned illumination optical system 4 is an example, and is changeable as appropriate. For example, a part of the above-mentioned illumination optical system 4 may be omitted. The illumination optical system 4 may include at least a part of the light source device 3. The illumination optical system 4 may include an aperture stop or an illumination stop.

The first observation optical system 5 forms an image of light from the specimen W. In this example, the first observation optical system 5 forms an image of fluorescence from a fluorescent substance included in the specimen W. The first observation optical system 5 includes an objective lens 21, a dichroic mirror 20, a filter 24, a lens 25, an optical path switching member 26, a lens 27, and a lens 28. The first observation optical system 5 shares the objective lens 21 and the dichroic mirror 20 with the illumination optical system 4. In FIG. 1 and other drawings, the optical path between the specimen W and the imager 6 is illustrated by solid lines. Fluorescence from the specimen W passes through the objective lens 21 and the dichroic mirror 20 to enter the filter 24. The filter 24 has characteristics that selectively transmit light in a predetermined wavelength band among light beams from the specimen W. For example, the filter 24 blocks illumination light reflected by the specimen W, external light, stray light, and the like. For example, the filter 24 is unitized with the filter 19 and the dichroic mirror 20, and this filter unit 23 is provided so as to be replaceable. For example, the filter unit 23 may be replaced depending on the wavelength of light (for example, the wavelength of the illumination light L, the wavelength of excitation light L1) emitted from the light source device 3 or the wavelength of fluorescence exiting from the specimen W, or may use a single filter unit supporting a plurality of excitation wavelengths and fluorescence wavelengths.

Light that has passed through the filter 24 enters the optical path switching member 26 through the lens 25. Light that has exited from the lens 25 passes through the optical path switching member 26 and then forms an intermediate image on an intermediate image plane 5b. For example, the optical path switching member 26 is a prism, and is provided so as to be insertable to and removable from the optical path of the first observation optical system 5. For example, the optical path switching member 26 is inserted to and removed from the optical path of the first observation optical system 5 by a driver (not shown) controlled by the controller 42. In the state in which the optical path switching member 26 is inserted to the optical path of the first observation optical system 5, the optical path switching member 26 guides fluorescence from the specimen W to an optical path toward the imager 6 by internal reflection.

The lens 27 converts fluorescence that has exited from an intermediate image (fluorescence that has passed through the intermediate image plane 5b) into parallel light, and the lens 28 condenses light that has passed through the lens 27. The first observation optical system 5 includes an astigmatic optical system (for example, a cylindrical lens 29). The cylindrical lens 29 acts on at least a part of fluorescence from the specimen W, and generates astigmatism for at least a part of the fluorescence. Specifically, the astigmatic optical system such as the cylindrical lens 29 generates an astigmatic difference by generating astigmatism for at least part of the fluorescence. The astigmatism is used to calculate the position of a fluorescent substance in the depth direction of the specimen W (the optical axis direction of the objective lens 21). The cylindrical lens 29 is provided to be insertable to and removable from an optical path between the specimen W and the imager 6 (for example, an imaging sensor 40). For example, the cylindrical lens 29 is insertable to and removable from an optical path between the lens 27 and the lens 28. The cylindrical lens 29 is disposed on the optical path in the mode to generate a three-dimensional super-resolution image, and is retracted from the optical path in the mode to generate a two-dimensional super-resolution image.

The microscope 1 according to the first embodiment includes a second observation optical system 30. The second observation optical system 30 is used to set an observation range, for example. The second observation optical system 30 includes, in order from the specimen W to a viewpoint Vp of an observer, an objective lens 21, a dichroic mirror 20, a filter 24, a lens 25, a mirror 31, a lens 32, a mirror 33, a lens 34, a lens 35, a mirror 36, and a lens 37. The second observation optical system 30 shares the configurations from the objective lens 21 to the lens 25 with the first observation optical system 5. Light from the specimen W passes through the lens 25, and then enters the mirror 31 in a state in which the optical path switching member 26 is retracted from the optical path of the first observation optical system 5. Light reflected by the mirror 31 enters the mirror 33 through the lens 32 to be reflected by the mirror 33, and then enters the mirror 36 through the lens 34 and the lens 35. Light reflected by the mirror 36 enters the viewpoint Vp through the lens 37. For example, the second observation optical system 30 forms an intermediate image of the specimen W on the optical path between the lens 35 and the lens 37. For example, the lens is an eyepiece, and the observer is able to set an observation range by observing the intermediate image.

The imager 6 takes an image formed by the first observation optical system 5. The imager 6 includes an imaging sensor 40 and a controller 41. For example, the imaging sensor 40 is a CMOS image sensor, and may be a CCD image sensor. For example, the imaging sensor 40 has a plurality of pixels two-dimensionally arranged, and has a structure in which a photoelectric conversion element such as a photodiode is disposed in each pixel. For example, in the imaging sensor 40, charges accumulated in the photoelectric conversion element are read by a readout circuit. The imaging sensor 40 converts the read charges into digital data, and outputs data (for example, image data) in the digital form in which pixel positions and grayscale values are associated with one another. The controller 41 controls the imaging sensor 40 to operate based on a control signal input from the controller 42 for the control device 8, and outputs data on taken images to the control device 8. The controller 41 outputs a charge accumulation period and a charge reading period to the control device 8.

The control device 8 generally controls the parts in the microscope 1. The control device 8 includes a controller 42 and an image processor 7. The controller 42 supplies, based on a signal indicating a charge accumulation period and a charge reading period (information on imaging timing) supplied from the controller 41, a control signal for switching between the light passing state that transmits light from the light source device 3 and the light blocking state that blocks light from the light source device 3 to the acousto-optic element 14. The acousto-optic element 14 switches between the light passing state and the light blocking state based on the control signal. The controller 42 controls the acousto-optic element 14 to control a period in which the specimen W is irradiated with the activation light L and a period in which the specimen W is not irradiated with the activation light L. The controller 42 controls the acousto-optic element 14 to control a period in which the specimen W is irradiated with the excitation light L1 and a period in which the specimen W is not irradiated with the excitation light L1. The controller 42 controls the acousto-optic element 14 to control the light intensity of the activation light L and the light intensity of the excitation light L1 that irradiate the specimen W.

Instead of the controller 42, the controller 41 may supply a control signal for switching between the light blocking state and the light passing state to the acousto-optic element 14 to control the acousto-optic element 14 based on the signal indicating the charge accumulation period and the charge reading period (information on imaging timing).

The controller 42 controls the imager 6 such that the imaging sensor 40 executes imaging. The controller 42 acquires imaging results (data on taken images) from the imager 6. The image processor 7 uses the imaging results of the imager 6 to perform image processing. Through this image processing, the position of a fluorescent substance is three-dimensionally acquired. The controller 42 changes the relative positions of the objective lens 21 and the specimen W (stage 2) in the optical axis direction of the objective lens 21, thereby changing the imaging position in the optical axis direction of the objective lens 21, and the image processor 7 three-dimensionally acquires the positions of a fluorescent substance at a plurality of the imaging positions different in the optical axis direction of the objective lens 21. The image processor 7 represents (replaces) the respective positions of fluorescent substances by (with) bright points, thereby acquiring a stereoscopic image (Z-Stack image, 3D-Stack image) spread in the optical axis direction of the objective lens 21.

Figure 2:
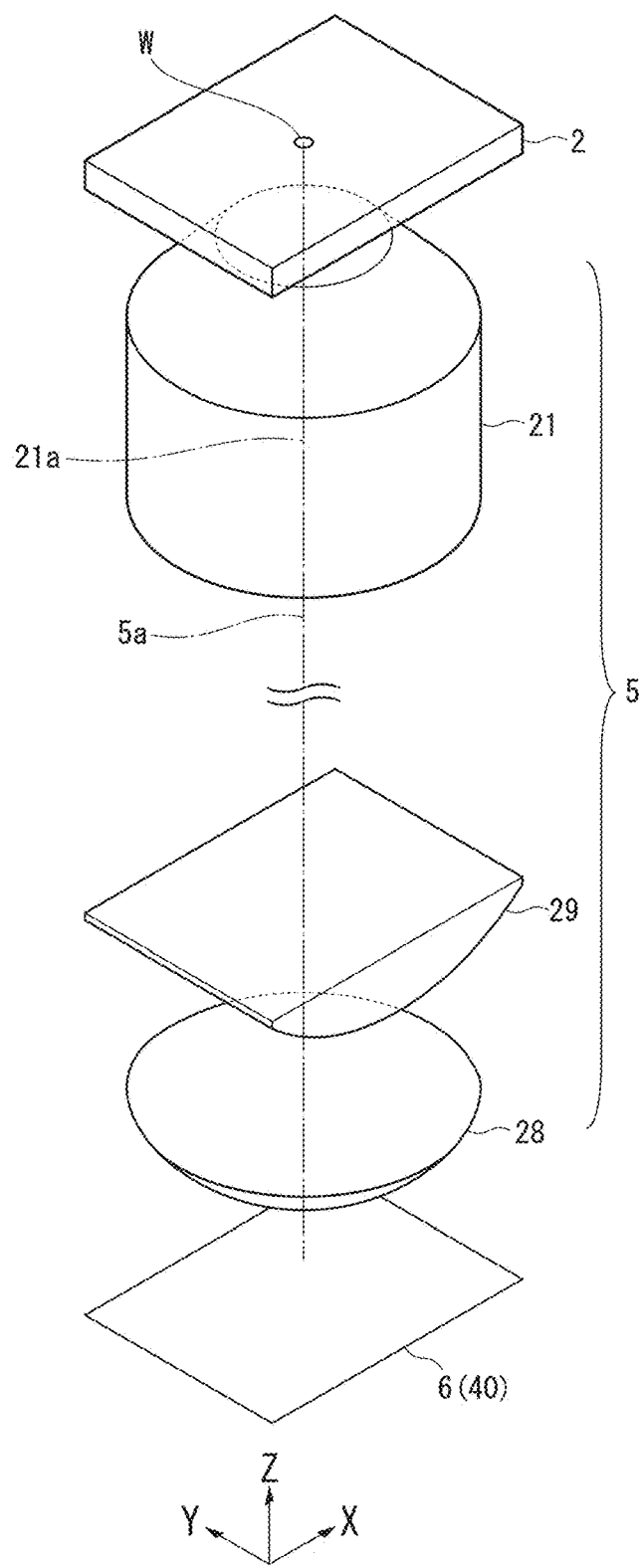
FIG. 2 is a diagram conceptually illustrating a first observation optical system and an imaging sensor.

First, a coordinate system used in the following description as appropriate is described. FIG. 2 is a diagram conceptually illustrating the first observation optical system 5 and the imaging sensor 40. In FIG. 1, an optical axis $5a$ of the first observation optical system 5 is an optical system that is bent by an optical path switch member 26. In FIG. 2, the first observation optical system 5 is conceptually illustrated as a straight optical system (an optical system in which the optical axis $5a$ of the first observation optical system 5 is not bent). In FIG. 2, the illustration of the configuration between the objective lens 21 and the cylindrical lens 29 is omitted. In this case, a direction parallel to the optical axis $5a$ of the first observation optical system 5 is a Z direction, and two directions that are perpendicular to the Z direction and perpendicular to each other are an X direction and a Y direction. For example, the X direction is a horizontal direction of the imaging sensor 40, and for example, the Y direction is a vertical direction of the imaging sensor 40. The cylindrical lens 29 is an optical member having power (refractive power) in only one of the vertical direction and the horizontal direction. It is assumed that the cylindrical lens 29 has the power in the XZ plane but does not have the power in the YZ plane. The astigmatic optical system may use, instead of the cylindrical lens 29, a toroidal lens having the power in both the vertical direction and the horizontal direction and the power is different in the two directions.

Figure 3A:
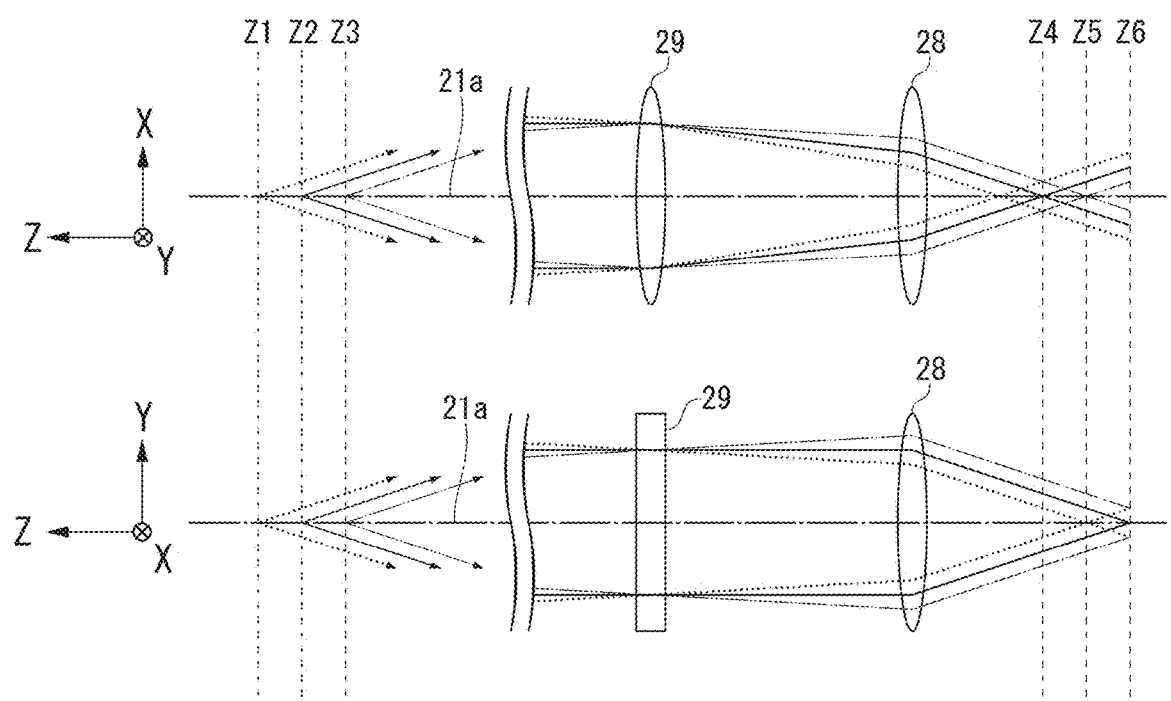
FIGS. 3A to 3D are each includes conceptual diagrams illustrating optical paths of fluorescence from positions different in a Z direction in a specimen and images of the fluorescence.
Figure 3B:
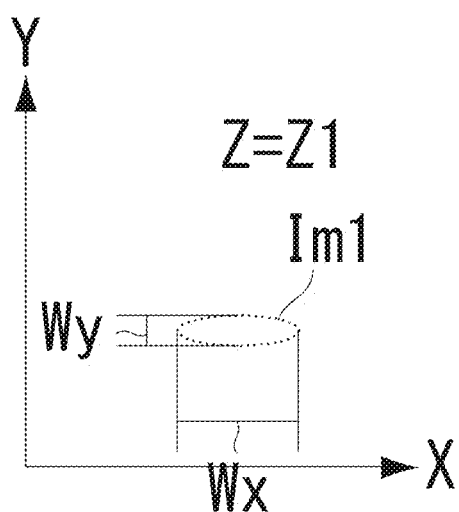
Figure 3C:
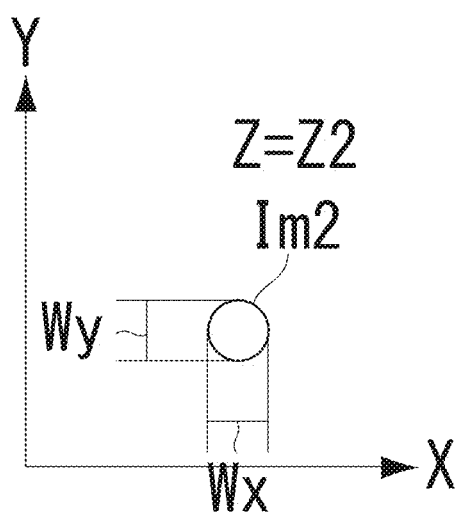
Figure 3D:
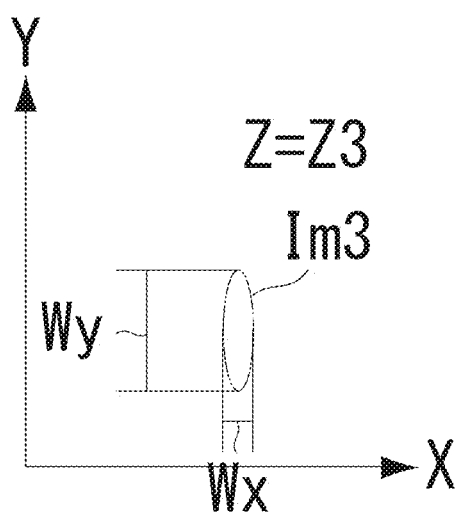

FIG. 3A is a diagram illustrating optical paths of fluorescence from positions different in the Z direction in the specimen W. FIGS. 3B to 3D are conceptual diagrams illustrating respective images of fluorescence from a position Z1, a position Z2, and a position Z3 in the Z direction. First, an optical path of fluorescence (indicated by solid lines in FIG. 3A) from the position Z2 is described. On the XZ plane (see the upper diagram in FIG. 3A), fluorescence from a fluorescent substance present at the position Z2 in the specimen W enters the cylindrical lens 29 as parallel light beams. The fluorescence is refracted by the cylindrical lens 29 and condensed, and is directed to the imaging sensor 40 (see 2) while being condensed through the lens 28. The width of the fluorescence image in the X direction becomes minimum at a position Z4 corresponding to a focus point on the XZ plane, and becomes larger as being apart from the position Z4 on the −Z side. On the YZ plane (see the lower diagram in FIG. 3A), fluorescence from the fluorescent substance present at the position Z2 in the specimen W enters the cylindrical lens 29 as parallel light beams. This fluorescence is not substantially refracted by the cylindrical lens 29, and enters the lens 28 as parallel light. This fluorescence is directed to the imaging sensor 40 (see FIG. 2) while being condensed by being refracted by the lens 28. The width of the fluorescence image in the Y direction becomes minimum at a position Z6 corresponding to a focus point on the YZ plane, and becomes larger as being apart from the position Z6 on the +Z side. A fluorescence image Im2 at an intermediate position Z5 between the position Z4 and the position Z6 becomes an exact circle in which a width Wx of the fluorescence image in the X direction and a width Wy of the fluorescence image in the X direction are equal to each other as illustrated in FIG. 3C. Thus, when the imaging sensor 40 is disposed at the position Z5, an image of an exact circle is acquired as a fluorescence image from the fluorescent substance present at the position Z2 in the specimen W.

Next, an optical path of fluorescence (indicated by dotted lines in FIG. 3A) from the position Z1 and its image are described. FIG. 3B is a diagram illustrating an optical path of fluorescence from a fluorescent substance present at the position Z1 in the specimen W and its fluorescence image. The position Z1 is located on the opposite side (+Z side) of the imaging sensor 40 (see FIG. 2) across the position Z2. On the XZ plane, the width of a fluorescence image in the X direction becomes minimum at a position apart from the position Z4 on the +Z side. On the YZ plane, on the other hand, the width of the fluorescence image in the Y direction becomes minimum at a position Z5. A fluorescence image Im1 at the position Z5 becomes an ellipse whose major axis is the X direction as illustrated in FIG. 3B. Thus, when the imaging sensor 40 is disposed at the position Z5, an elliptic image whose major axis is the X direction is acquired as a fluorescence image from the fluorescent substance present at the position Z1 in the specimen W.

Next, an optical path of fluorescence (indicated by two-dot chain lines in FIG. 3A) from the position Z3 and an image thereof are described. The position Z3 is located on the same side (−Z side) of the imaging sensor 40 (see FIG. 2) with respect to the position Z2. In the XZ plane, the width of the image of fluorescence in the X direction becomes minimum at the position Z5. On the other hand, in the YZ plane, the width of the image of fluorescence in the Y direction becomes minimum at a position away from the position Z6 on the side (−Z side) opposite to the specimen W. An image Im3 of fluorescence at the position Z5 becomes an ellipse whose major axis is the Y direction as illustrated in FIG. 3D. Thus, when the imaging sensor 40 is disposed at the position Z5, an elliptic image whose major axis is the Y direction is acquired as a fluorescence image of the fluorescent substance present at the position Z3 in the specimen W.

For example, the image processor 7 illustrated in FIG. 1 performs elliptical Gaussian fitting to calculate the centroid position of the image of fluorescence, thereby calculating the position (XY coordinates) of the fluorescent substance in the XY plane. As illustrated in FIGS. 3B to 3D, the oblateness (ellipticity) of the fluorescence image changes depending on the position of the fluorescent substance in the Z direction, and the image processor 7 calculates the position (Z coordinate) of the fluorescent substance in the Z direction based on the oblateness of the image of fluorescence.

Figure 4:
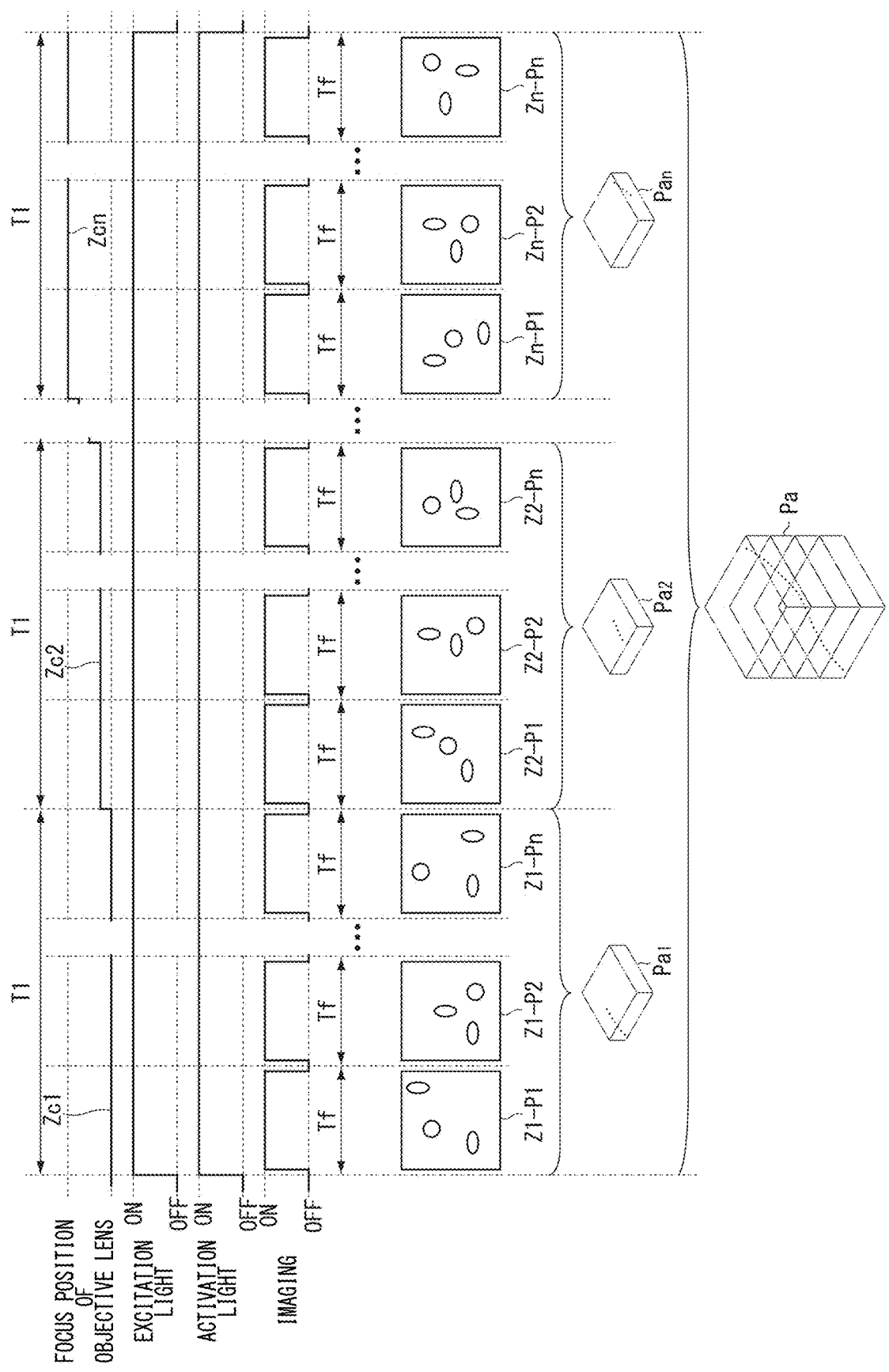
FIG. 4 is a diagram illustrating an example of a sequence of illumination and imaging.

FIG. 4 is a diagram illustrating an example of a sequence of illumination and imaging. In an image generation period T1, the controller 42 irradiates the specimen W with the activation light L and the excitation light L1. In the image generation period T1, the controller 42 controls the imager 6 to take images in a Plurality of frame periods Tf. In the first image generation period T1, the controller 42 sets the focus position of the objective lens 21 to Zc1. Symbols Z1-P1 to Z1-P represent respective taken images (imaging results) obtained in the frame periods Tf in the first image generation period T1. After the end of the image generation period T1, the imaging position is changed, and an image generation period T1 corresponding to the next imaging position is started. For example, the imaging position is changeable by the controller 42 controlling the stage 2 to change the distance between the specimen w on the stage 2 and the objective lens 21 in the Z direction. The imaging position is a front focus position of the objective lens 21 in the specimen W.

In a second image generation period T1 following the first image generation period T1, the controller 42 sets the focus position of the objective lens 21 to Zc2. Symbols Z2-P1 to Z2-Pn represent respective taken images (imaging results) obtained in frame periods Tf in the second image generation period T1. The image generation period T1 is repeatedly provided until the imaging at a predetermined imaging position is completed. In FIG. 4, n (n is a natural number of 2 or more) image generation periods T1 are provided, and in the n-th image generation period T1, the controller 42 sets the focus position of the objective lens 21 to Zcn. Symbols Zn-P1 to Zn-Pn represent respective taken images (imaging results) obtained in frame periods Tf in the n-th image generation period T1.

For example, after the imaging at the predetermined imaging position is finished, the image processor 7 uses the imaging results to perform image processing. The image processor calculates the centroid position of a fluorescent image included in each of the taken images Z1-P1 to Z1-Pn as position information. For example, the image processor 7 calculates the centroid position of the fluorescence image and generates three-dimensional distribution information (denoted with symbol Pa1) on centroid positions by using at least a part of a plurality of centroid positions corresponding to a plurality of fluorescence images included in the taken images Z1-P1 to Z1-Pn.

The image processor 7 generates three-dimensional distribution information (denoted with symbol Pa2) on centroid positions by using at least a part of a plurality of centroid positions corresponding to a plurality of fluorescence images included in a plurality of taken images Z2-P1 to Z2-Pn. Subsequently, the image processor 7 similarly generates three-dimensional distribution information (denoted with symbol Pan) on centroid positions by using a plurality of taken images Zn-P1 to Zn-Pn. The image processor 7 may generate three-dimensional distribution information Pa by using at least a part of three-dimensional distribution information (Pa1 to Pan). The image processor 7 may generate a three-dimensional image in which the centroid position is represented as a bright point and display the generated three-dimensional image on the display device 44 based on each piece of three-dimensional distribution information (Pa1 to Pan). The image processor 7 may generate a three-dimensional image in which the centroid position is represented as a bright point and display the generated three-dimensional image on the display device 44 based on the three-dimensional distribution information Pa. Three-dimensional distribution information or a three-dimensional image obtained at a predetermined imaging position is referred to as "layer" (for example, Pa1). For generating the three-dimensional distribution information Pa1, for example, the centroid position of fluorescence images may be corrected among the taken images Z1-P1 to Z1-Pn. In other words, position correction (drift correction) may be performed between taken images to generate three-dimensional distribution information Pa1, and one three-dimensional image may be generated based on the generated three-dimensional distribution information Pa1.

Figure 5A:
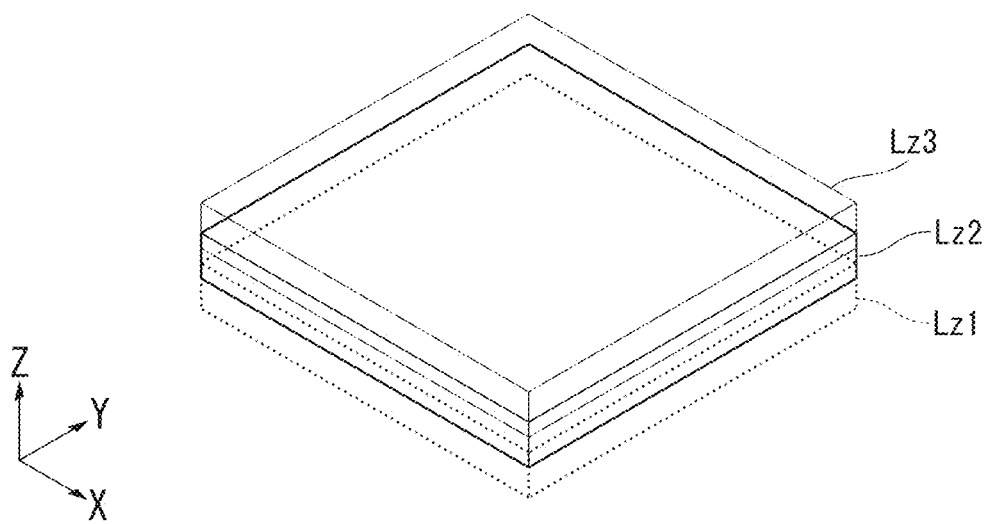
FIGS. 5A and 5B are each includes conceptual diagrams illustrating an example of three-dimensional images of a specimen taken at a plurality of imaging positions.
Figure 5B:
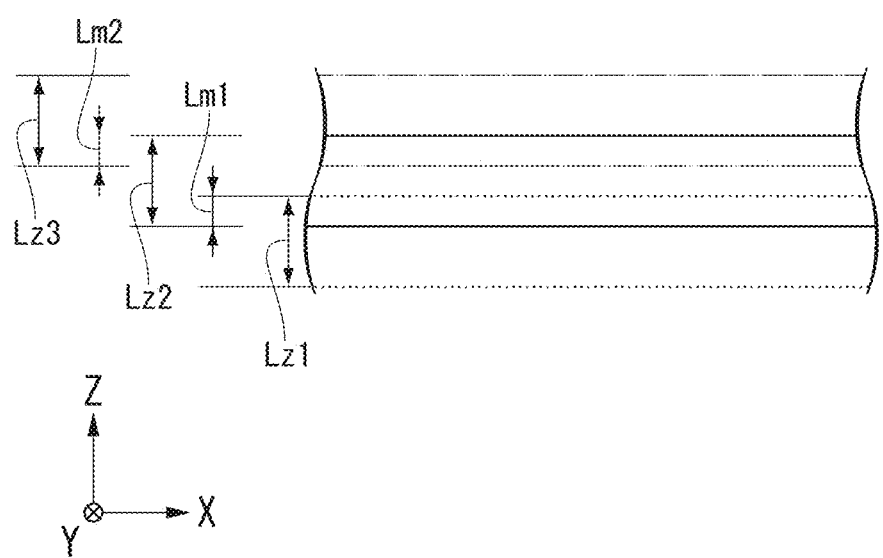

FIGS. 5A and 5B are each includes conceptual diagrams illustrating an example of a three-dimensional image of a specimen imaged at a plurality of imaging positions in the first embodiment. FIG. 5A illustrates a perspective view, and FIG. 5B illustrates a sectional view. FIGS. 5A and 5B are each illustrates an example of three-dimensional images obtained by imaging at three imaging positions, and in the following, the images are referred to as "first layer Lz1", "second layer Lz2", and "third layer Lz3". The number of imaging positions is not limited, and may be two or four or more. It is assumed in the following description that the layers have the same thickness, but the thickness of at least one of the layers may be different from those of the other layers. The thickness (dimension in Z direction) of each layer is, for example, about several hundreds of nm (for example, 600 nm).

For example, the first layer Lz1 is a three-dimensional image (layer) obtained by imaging at a first imaging position closest to the objective lens 21, and is a layer in contact with a cover glass. The second layer Lz2 is a layer adjacent to (right above) the first layer Lz1, and is a three-dimensional image obtained by imaging at a second imaging position different from the first imaging position in the thickness direction of the specimen W (direction of the optical axis 21a of the objective lens 21). The third layer Lz3 is a layer adjacent to (right above) the second layer Lz2, and is a three-dimensional image obtained by imaging at a third imaging position different from the first imaging position and the second imaging position in the thickness direction of the specimen (direction of the optical axis 21a of the objective lens). The first imaging position, the second imaging position, and the third imaging position are set such that each of the first layer Lz1, the second layer Lz2, and the third layer Lz3 overlaps with a corresponding adjacent layer in the Z direction (thickness direction, the same direction as the optical axis 21a of the objective lens 21). In FIG. 5B, symbol Lm1 represents an overlapping region where the first layer Lz1 and the second layer Lz2 overlap with each other, and symbol Lm2 represents an overlapping region where the second layer Lz2 and the third layer Lz3 overlap with each other. The thicknesses (dimension in the Z direction) of the overlapping region Lm1 and the overlapping region Lm2 are set to any desired values, and for example, set to about several tens of percent (10% or more and 90% or less) of the thickness of each layer. It is assumed that each layer (for example, the first layer Lz1) does not overlap with a layer that is two layers away therefrom in the Z direction (for example, the third layer Lz3), but at least one of a plurality of layers (for example, the first layer) may overlap with a layer that is two or more layers away therefrom (for example, the third layer Lz3).

The image processor 7 uses the layers, which are imaging results, to calculate the respective positions of fluorescent substances included in each of the layers as described with reference to FIGS. 3A to 3D and FIG. 4. The timing of imaging is different among the layers. Thus, for example, the relation of relative positions between the visual field and the fluorescent substance may shift in the XYZ directions among the layers due to the position shift between the objective lens 21 and the specimen W. It is therefore preferred that the image processor 7 correct the position shift (drift) in the XYZ directions among the layers as one processing in the image processing.

The image processor 7 corrects the second layer Lz2 with respect to the first layer Lz1 by using an overlapping region between imaging results (first layer Lz1) of the imager 6 at a first imaging position and imaging results (second layer Lz2) of the imager 6 at a second imaging position different from the first imaging position in the same direction as the optical axis 21a of the objective lens 21. Specifically, the image processor 7 uses the overlapping region between the first layer Lz1 and the second layer Lz2 to correct the positions of fluorescent substances in the second layer Lz2 in the XYZ directions, and correct information obtained from the imaging results of the imager 6 (for example, the positions of the fluorescent substances in the second layer Lz2).

Figure 6:
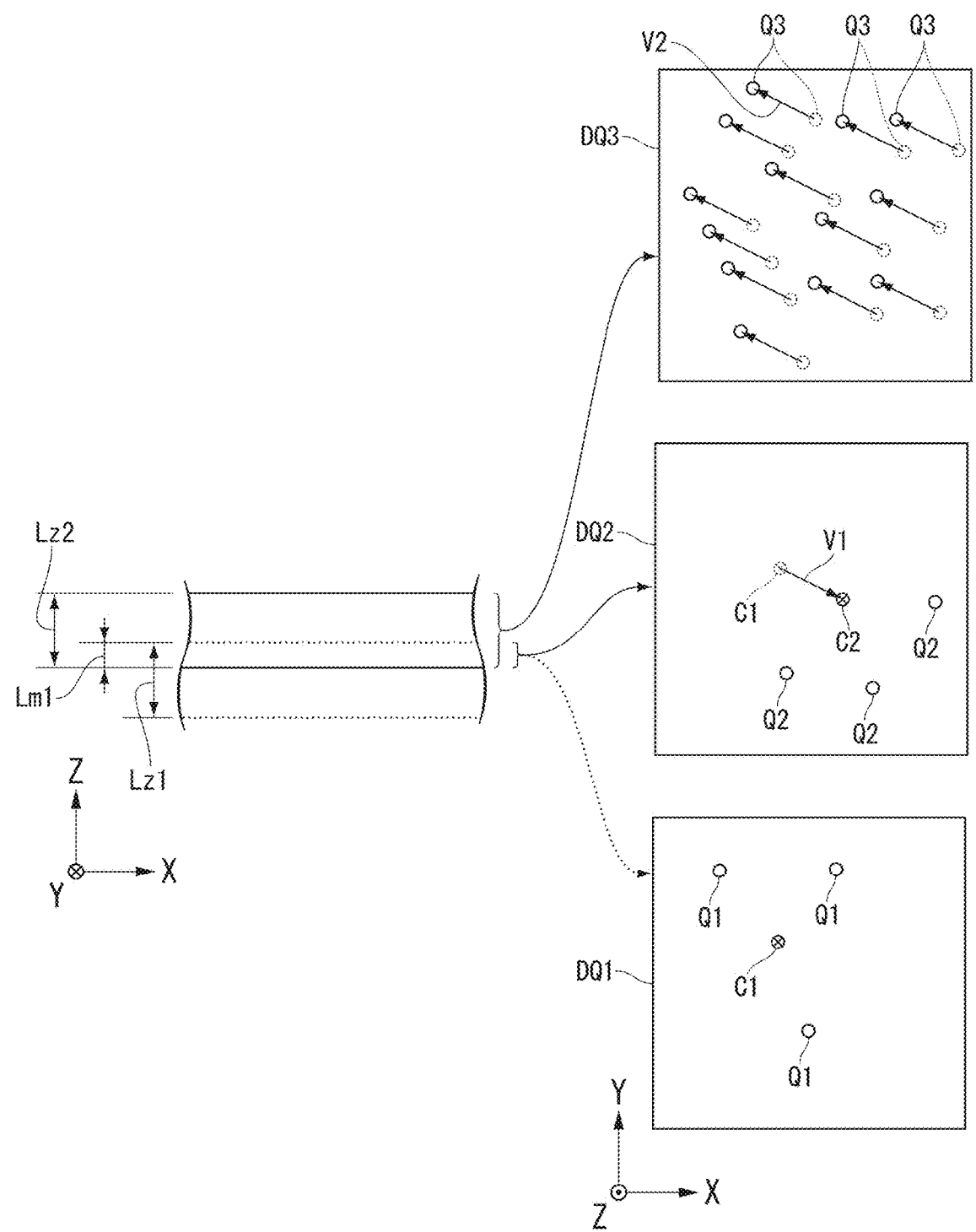
FIG. 6 is a conceptual diagram conceptually illustrating correction processing by an image processor according to the present embodiment.

FIG. 6 is a conceptual diagram illustrating correction processing by the image processor according to the first embodiment. Symbol DQ1 in FIG. 6 represents a distribution in the XY plane of fluorescent substances (bright points Q1) in an overlapping region Lm1 between the first layer Lz1 and the second layer Lz2. For example, the image processor 7 extracts three-dimensional positions of fluorescent substances included in the distribution DQ1 by using three-dimensional information L three-dimensional point group data) on a distribution of fluorescent substances included in the first layer Lz1. The image processor 7 determines a centroid position C1 of a plurality of bright points Q1 in the distribution DQ1. For example, positions of the bright points Q1 are each expressed by three-dimensional coordinates, and when the weights of the bright points are equal to each other, the centroid position C1 is expressed by an arithmetic average of coordinates of the bright points Q1. In the case where the weight of each bright point is determined in accordance with the brightness of a fluorescence image, for example, the centroid position C1 is expressed by a weighted average obtained by adding the weights of bright points to the coordinates of the bright points Q1.

Symbol DQ2 in FIG. 6 represents a distribution in the XY plane of fluorescent substances (bright points Q2) in the overlapping region Lm1 between the second layer Lz2 and the first layer Lz1. For example, the image processor 7 extracts three-dimensional positions of the fluorescent substances included in the distribution DQ2 from three-dimensional information (three-dimensional point group data) on a distribution of fluorescent substances included in the second layer Lz2. The image processor 7 determines a centroid position C2 of a plurality of bright points Q2 in the distribution DQ2. As the method for calculating the centroid position C2, arithmetic average or weighted average may be used similarly to the centroid position C1.

The image processor 7 corrects a position shift between the positions of fluorescent substances included in the first layer Lz1 and the positions of fluorescent substances included in the second layer Lz2. A vector V1 indicating the difference between the centroid position C2 and the centroid position C1 corresponds to a position shift amount (drift amount) of the second layer Lz2 with respect to the first layer Lz1. The image processor 7 corrects the positions of the fluorescent substances included in the second layer Lz2 such that the difference between the positions of fluorescent substances included in the overlapping region Lm1 in the imaging results of the first layer Lz1 and the positions of fluorescent substances included in the overlapping region Lm1 in the imaging results of the second layer Lz2 is reduced. For example, the image processor 7 calculates a vector obtained by inverting the direction (symbol) from the vector V1 as a correction amount.

Symbol DQ3 in FIG. 6 represents a distribution of fluorescent substances (bright points Q3) in the second layer Lz2 obtained from the imaging results of the second layer Lz2. The distribution DQ3 corresponds to a distribution of fluorescent substances in the overlapping region Lm1 in the second layer Lz2 and in regions other than the overlapping region Lm1. In the distribution DQ3, bright points Q3 before correction are indicated by dotted lines, and corrected bright points Q3 are indicated by solid lines. The image processor 7 corrects each position of bright points Q3 included in the distribution DQ3 by a vector V2 corresponding to a correction amount. The vector V2 is a vector obtained by inverting the orientation of the vector V1 corresponding to the position shift amount.

In this manner, the second layer Lz2 is positioned with respect to the first layer Lz1. The image processor 7 similarly positions the third layer Lz3 illustrated in FIGS. 5A and 5B with respect to the corrected second layer. The corrected second layer Lz2 is positioned with the first layer Lz1, and hence the corrected third layer Lz3 matches with the first layer Lz1 in terms of position relation. As described above, the image processor 7 performs the processing to position an adjacent layer with a layer (for example, the first layer Lz1) serving as a position reference and the processing to position an adjacent layer to the positioned layer in this order, thereby positioning a plurality of layers with the reference layer.

In the present embodiment, the centroid position C1 and the centroid position C2 are calculated to calculate a position shift amount between the first layer Lz1 and the second layer Lz2, but the position shift amount between the first layer Lz1 and the second layer Lz2 may be calculated by analyzing autocorrelation between the distribution DQ1 and the distribution DQ2. Specifically, the autocorrelation between the distribution DQ1 and the distribution DQ2 may be analyzed to correct a position shift between the first layer Lz1 and the second layer Lz2.

Returning to FIG. 1, for example, the control device 8 is communicably connected to a storage device (memory) 43 and a display device (display) 44. For example, the display device 44 is a liquid crystal display. For example, the display device 44 displays various kinds of images, such as images representing various settings of the microscope 1 images taken by the imager 6, and images generated from the taken images. The controller 42 controls the display device 44 to display various kinds of images on the display device 44. For example, the controller 42 supplies data on images (for example, super-resolution images such as STORM images and PALM images) generated by the image processor 7 to the display device 44, and displays the images on the display device 44. For example, the microscope 1 is able to display super-resolution images of a specimen W to be observed as a live video. For example, the storage device 43 is a magnetic disk or an optical disc, and stores therein various kinds of data, such as data on various settings of the microscope 1, data on images taken by the imager 6, and data on images generated by the image processor 7. For example, the controller 42 is able to supply data on super-resolution images stored in the storage device 43 to the display device 44, and display the super-resolution images on the display device 44. The controller 42 controls the storage device 43 to store various kinds of data in the storage device 43.

Figure 7:
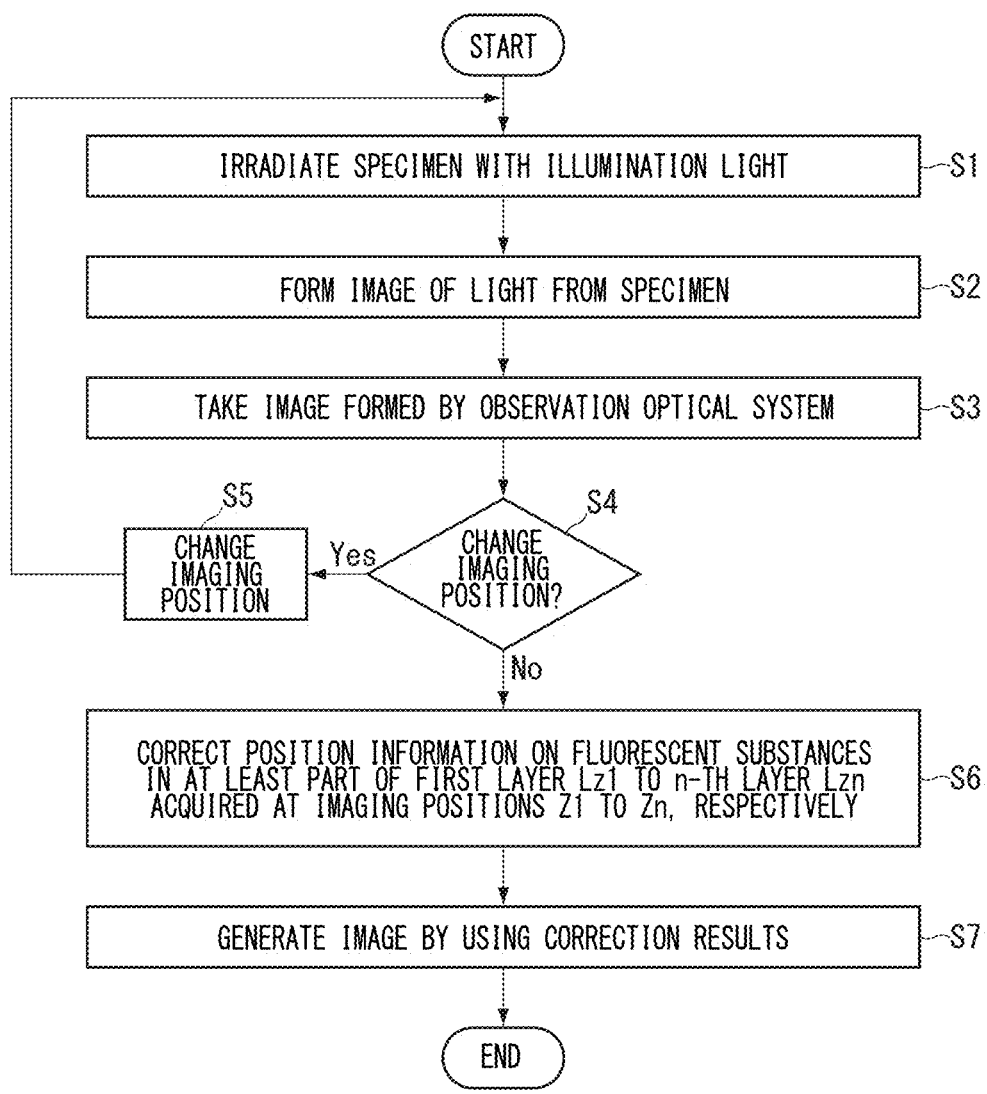
FIG. 7 is a flowchart illustrating an example of an observation method according to an embodiment.

Next, an observation method according to the embodiment is described based on the configuration of the above-mentioned microscope 1. FIG. 7 is a flowchart illustrating an example of the observation method according to the embodiment. In Step S1, the illumination optical system 4 irradiates a specimen W with illumination light (activation light, excitation light). In Step S2, the first observation optical system 5 forms an image of light (for example, fluorescence) from the specimen W. In Step S3, the imager 6 takes the image formed by the first observation optical system 5. Taken image data representing the imaging result by the imager 6 is supplied to the image processor 7. After the imaging in a predetermined number of frame periods is finished in Step S3, the controller 42 determines in Step S4 whether to change the imaging position. When the imaging of the specimen W at imaging positions Z1 to Zn designated in advance (determined in advance) is not completed, the controller 42 determines to change the imaging position (Yes in S4). When it is determined to change the imaging position, in Step S5, the imager 6 controls at least one of the objective lens 21 and the stage 2 to change the relative positions between the specimen W on the stage 2 and the objective lens 21 in the optical axis direction of the objective lens 21. After the processing in Step S5 is finished, the controller 42 returns to Step S1, and repeatedly performs processing from Step S1 to Step S4.

In Step S4, when the imaging of the specimen W at imaging positions Z1 to Zn designated in advance (determined in advance) has been completed, the controller determines not to change the imaging position (No in Step S4). When the controller 42 determines not to change the imaging position (No in Step S4), in Step S6, the image processor 7 corrects positions of fluorescent substances in at least a part of the first layer Lz1 to the n-th layer Lzn acquired at the imaging positions Z1 to Zn, respectively. As the correction method, for example, the method described above with reference to FIG. 6 is used in Step S7, the image processor 7 generates an image by using the correction results. For example, the image processor 7 generates a three-dimensional image by using at least a part of bright points included in the first layer Lz1 and at least a part of corrected bright points included in the second layer Lz2 to the n layer Lzn.

In the above-mentioned overlapping region Lm1, the region used for the image processor 7 to calculate the correction amount may be the entire overlapping region Lm1 or a partial region (for example, a part on XY plane or a part in Z direction). The image processor 7 may calculate the centroid position of bright points by using all or a part of bright points included in the region used to calculate the correction amount. For example, the image processor 7 may calculate the centroid position of bright points by selectively using bright points corresponding to a fluorescence image whose brightness is equal to or more than a threshold among fluorescence images. In the case of observing a specimen by irradiating the specimen with light having a plurality of wavelengths, the centroid position may be calculated by using bright points corresponding to a fluorescence image obtained by irradiating the specimen with light having a given wavelength. The centroid position may be calculated by determining centroid positions by using bright points corresponding to fluorescence images obtained for the wavelengths and averaging the centroid positions for the wavelengths. The above contents are applicable also to the following embodiments.

Second Embodiment

The following describes a second embodiment. In the second embodiment, the same configurations as those in the above-mentioned embodiment are denoted with the same reference numerals, and the descriptions thereof are omitted or simplified. In the second embodiment, an example of position correction of a fluorescent substance in the case where a third layer Lz3 overlaps with a first layer Lz1 and a second layer Lz2 is described.

Figure 8A:
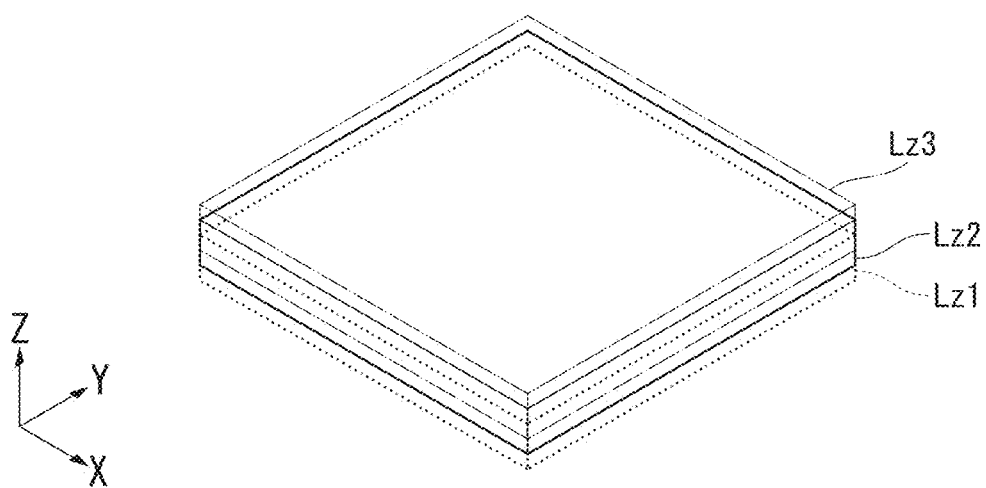
FIGS. 8A and 8B are each includes conceptual diagrams illustrating an example of layers set for a specimen in a second embodiment.
Figure 8B:
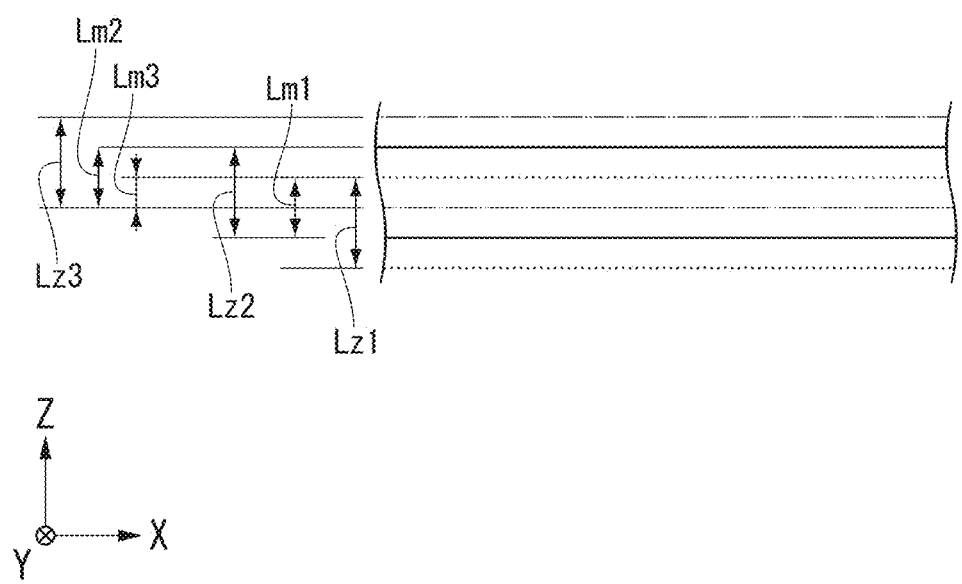

FIGS. 8A and 8B are each includes conceptual diagrams illustrating an example of layers set for a specimen in the second embodiment. FIG. 8A illustrates a perspective view, and FIG. 8B illustrates a sectional view. FIGS. 8A and 8B are each illustrates three layers (first layer Lz1, second layer Lz2, and third layer Lz3), but the number of layers is not limited and may be four or more. The first layer Lz1 and the second layer Lz2 overlap with each other in an overlapping region Lm1 in the same direction as the optical axis 21a (see FIG. 1) of the objective lens 21. The thickness of the overlapping region Lm1 is about ⅔ of the thickness of the second layer Lz2. The second layer Lz2 and the third layer Lz3 overlap with each other in an overlapping region Lm2 in the same direction as the optical axis 21a (see FIG. 1) of the objective lens 21. The thickness of the overlapping region Lm2 is about ⅔ of the thickness of the third layer Lz3. The third layer Lz3 overlaps with the first layer Lz1 in the overlapping region Lm3 in the overlapping region Lm2. The overlapping region Lm3 between the third layer Lz3 and the first layer Lz1 is a part corresponding to about ⅓ of the thickness of the third layer Lz3.

Figure 9A:
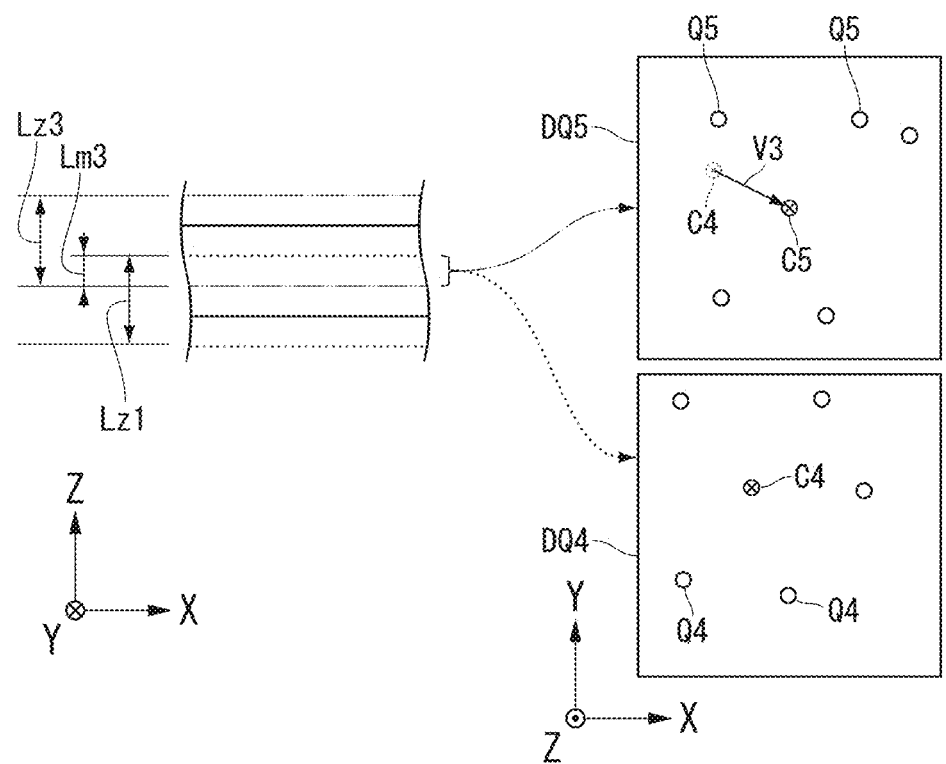
FIGS. 9A and 9B are each includes conceptual diagrams illustrating correction processing by an image processor according to the second embodiment.
Figure 9B:
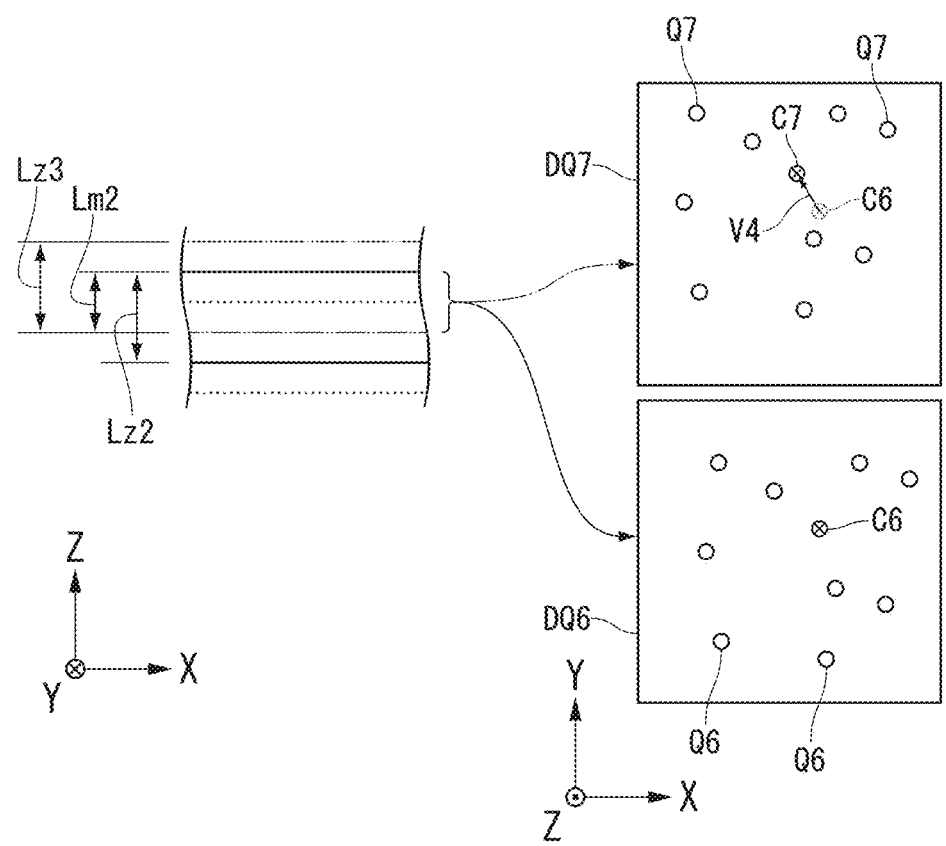

FIGS. 9A and 9B are each includes conceptual diagrams illustrating correction processing by the image processor according to the second embodiment. FIG. 9A corresponds to processing to calculate a position shift amount of the third layer Lz3 with respect to the first layer Lz1, and FIG. 9B corresponds to processing to calculate a position shift amount of the third layer Lz3 with respect to the second layer Lz2.

Symbol DQ4 in FIG. 9A represents a distribution of fluorescent substances (bright points Q4) in the overlapping region Lm3 in the first layer Lz1. For example, the image processor 7 extracts three-dimensional positions of the fluorescent substances included in the distribution DQ4 from three-dimensional information (three-dimensional point group data) on the distribution of fluorescent substances included in the first layer Lz1. The image processor 7 determines a centroid position C4 of a plurality of bright points Q4 in the distribution DQ4. As the method for calculating the centroid position C4, arithmetic average or weighted average may be used as described in the first embodiment.

Symbol DQ5 in FIG. 9A represents a distribution of fluorescent substances (bright points Q5) included in the overlapping region Lm3 in the third layer Lz3. For example, the image processor 7 extracts three-dimensional positions of the fluorescent substances included in the distribution DQ5 from three-dimensional information (three-dimensional point group data) on the distribution of the fluorescent substances included in the third layer Lz3. The image processor 7 determines a centroid position C5 of a plurality of bright points Q5 in the distribution DQ5. As the method for calculating the centroid position C5, arithmetic average or weighted average may be used as described in the first embodiment. A vector V3 representing the difference between the centroid position C5 and the centroid position C4 corresponds to a position shift amount of the third layer Lz3 with respect to the first layer Lz1.

Symbol DQ6 in FIG. 9B represents a distribution of fluorescent substances (bright points Q6) in the overlapping region Lm2 in the second layer Lz2 positioned with respect to the first layer Lz1 as described in the first embodiment. For example, the image processor extracts the three-dimensional positions of the fluorescent substances included in the distribution DQ6 from three-dimensional information (corrected three-dimensional point group data) on a distribution of fluorescent substances included in the second layer Lz2. The image processor 7 determines a centroid position C6 of a plurality of bright points Q6 in the distribution DQ6. As the method for calculating the centroid position C6, arithmetic average or weighted average may be used as described in the first embodiment.

Symbol DQ7 in FIG. 9B represents a distribution of fluorescent substances (bright points Q7) included in the overlapping region Lm2 in the third layer Lz3. For example, the image processor 7 extracts the positions of the fluorescent substances included in the distribution DQ7 from three-dimensional information (three-dimensional point group data) on a distribution of fluorescent substances included in the third layer Lz3. The image processor 7 determines a centroid position C7 of a plurality of bright points Q7 in the distribution DQ7. As the method for calculating the centroid position C7, arithmetic average or weighted average may be used as described in the first embodiment. A vector V4 representing the difference between the centroid position C7 and the centroid position C6 corresponds to a corrected position shift amount of the third layer Lz3 with respect to the second layer Lz2.

Figure 10A:
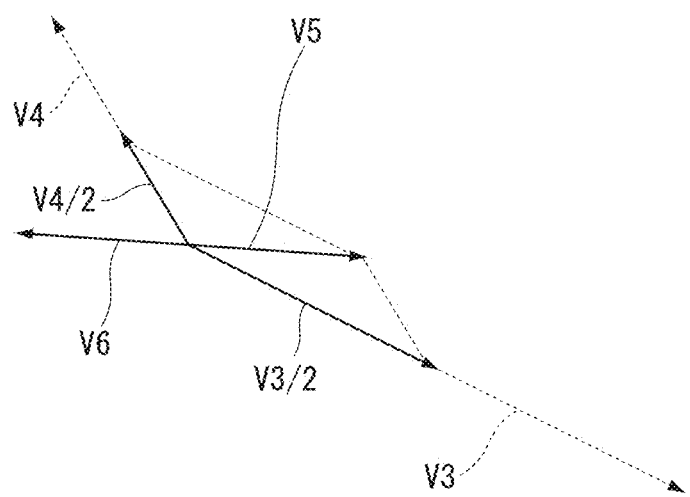
FIGS. 10A and 10B are each includes conceptual diagrams illustrating an example of a method for calculating a correction amount by the image processor.
Figure 10B:
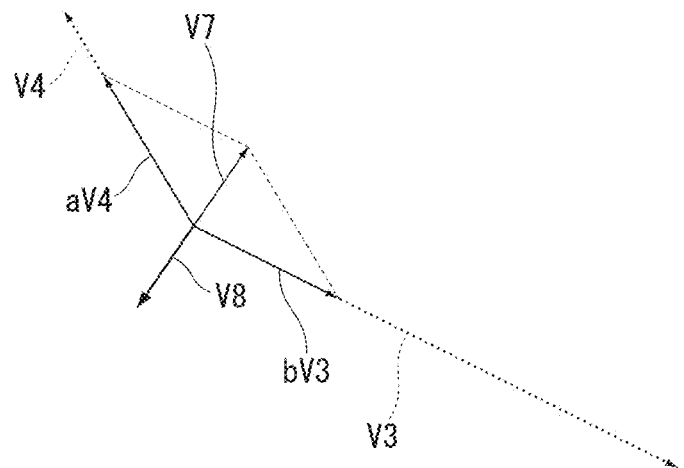

FIGS. 10A and 10B are each includes conceptual diagrams illustrating an example of a method of calculating the correction amount by the image processor. In FIG. 10A, the image processor 7 calculates a vector V5, which is obtained by averaging the vector V3 (symbol DQ5 in FIG. 9A) indicating the position shift amount of the third layer Lz3 with respect to the first layer Lz1 and the vector V4 (symbol DQ7 in FIG. 9B) indicating the position shift amount of the third layer Lz3 with respect to the corrected second layer Lz2, as a position shift amount of the third layer Lz3. In FIG. 9A, V3/2 and V4/2 indicate a half vector of the vector V3 and a half vector of the vector V4, respectively. The image processor 7 calculates a vector V6 obtained by inverting the orientation of the vector V5. The image processor 7 uses the vector V6 as a correction amount for the third layer Lz3 to correct the positions of fluorescent substances (bright points) included in the third layer Lz3.

In FIG. 10B, the image processor 7 weights information obtained from imaging results of the imager 6 performed on the overlapping region Lm3 between the first layer Lz1 and the third layer Lz3 (for example, the vector V3 in symbol DQ5 in FIG. 9A) and information obtained from imaging results of the imager 6 performed on the overlapping region Lm2 between the second layer Lz2 and the third layer Lz3 (for example, the vector V4 in symbol DQ7 in FIG. 9B), thereby correcting the positions of the fluorescent substances included in the third layer Lz3. For example, the image processor 7 calculates a vector V7 obtained by weighting and combining the vector V3 and the vector V4 as a vector indicating a position shift amount of the third layer Lz3. In FIG. 9B, aV3 and bV4 represent a vector that is a times as large as the vector V3 and a vector that is b times as large as the vector V4. The vector V7 is expressed by the following Expression (1) by using weighting coefficients a and b:

$$V7=(aV3+bV4) \tag{1}$$

where a+b=1.

For example, the weighting coefficient a is determined in accordance with time from imaging for the first layer Lz1 to imaging for the third layer Lz3, and is set such that the weighting coefficient a becomes smaller as the time becomes longer. For example, the weighting coefficient b is determined in accordance with time from imaging for the second layer Lz2 to imaging for the third layer Lz3, and is set such that the weighting coefficient b becomes smaller as the time becomes longer. The weighting coefficients a and b may be set in consideration of other parameters than the time between the imaging. For example, the weighting coefficients a and b may be set in consideration of the distance between layers or the number of bright points used to calculate the centroid position of the bright points. The image processor 7 calculates a vector V8 obtained by inverting the orientation of the vector V7. The image processor 7 uses the vector V8 as a correction amount for the third layer Lz3, and corrects the positions of fluorescent substances (bright points) included in the third layer Lz3.

Third Embodiment

The following describes a third embodiment. In the third embodiment, the same configurations as those in the above-mentioned embodiments are denoted with the same reference numerals, and the descriptions thereof are omitted or simplified. In the third embodiment, the image processor 7 calculates a correction amount of the position of a fluorescent substance included in the second layer Lz2 by selectively using a region designated from among overlapping regions between the first layer Lz1 and the second layer Lz2. As preprocessing for correction processing, the image processor 7 generates information (hereinafter referred to as "reference information") on bright points in each layer obtained from imaging results of the imager 6.

Figure 11:
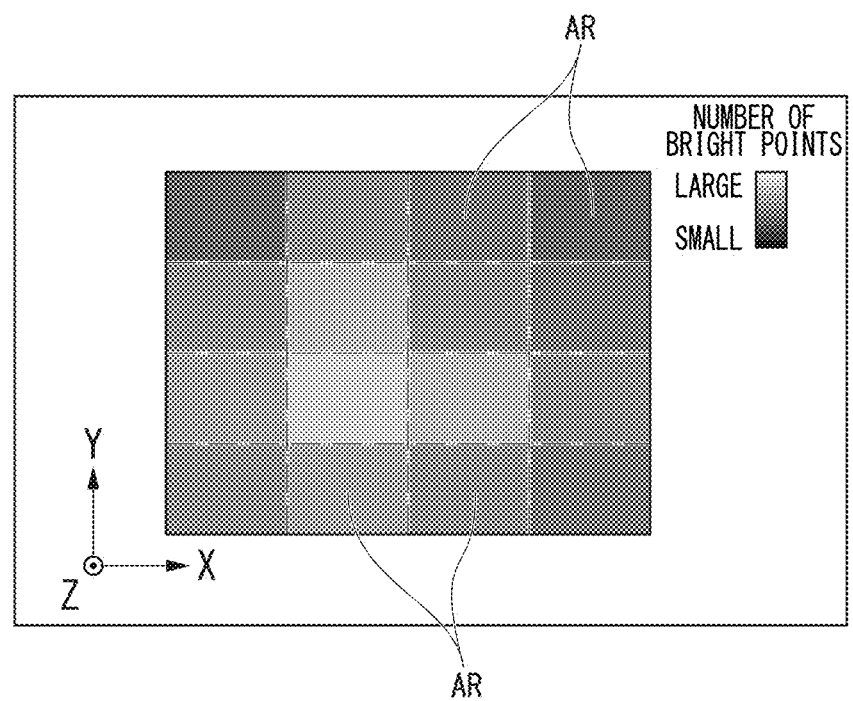
FIG. 11 is a conceptual diagram illustrating an image in which the number of bright points included in each of a plurality of regions in a predetermined layer is visualized.

FIG. 11 is an image in which the number of bright points included in each of a plurality of regions AR in a predetermined layer (for example, the first layer Lz1) is visualized (with color, contrast, or numerical values). The controller 41 generates the image illustrated in FIG. 11, and displays the image on the display device 44 (see FIG. 1). While looking at the image illustrated in FIG. 11 displayed on the display device 44, for example, the user is able to designate a region in which the number of bright points is relatively large as a region used to calculate a correction amount. The use of the region in which the number of bright points is relatively large to perform correction processing enables improved accuracy of correction. The region AR used to calculate the correction amount may be designated for each layer.

Fourth Embodiment

The following describes a fourth embodiment. In the fourth embodiment, the same configurations as those in the above-mentioned embodiments are denoted with the same reference numerals, and the descriptions thereof are omitted or simplified. In the fourth embodiment, the image processor 7 performs correction processing for each of a plurality of regions set for a plurality of layers.

Figure 12A:
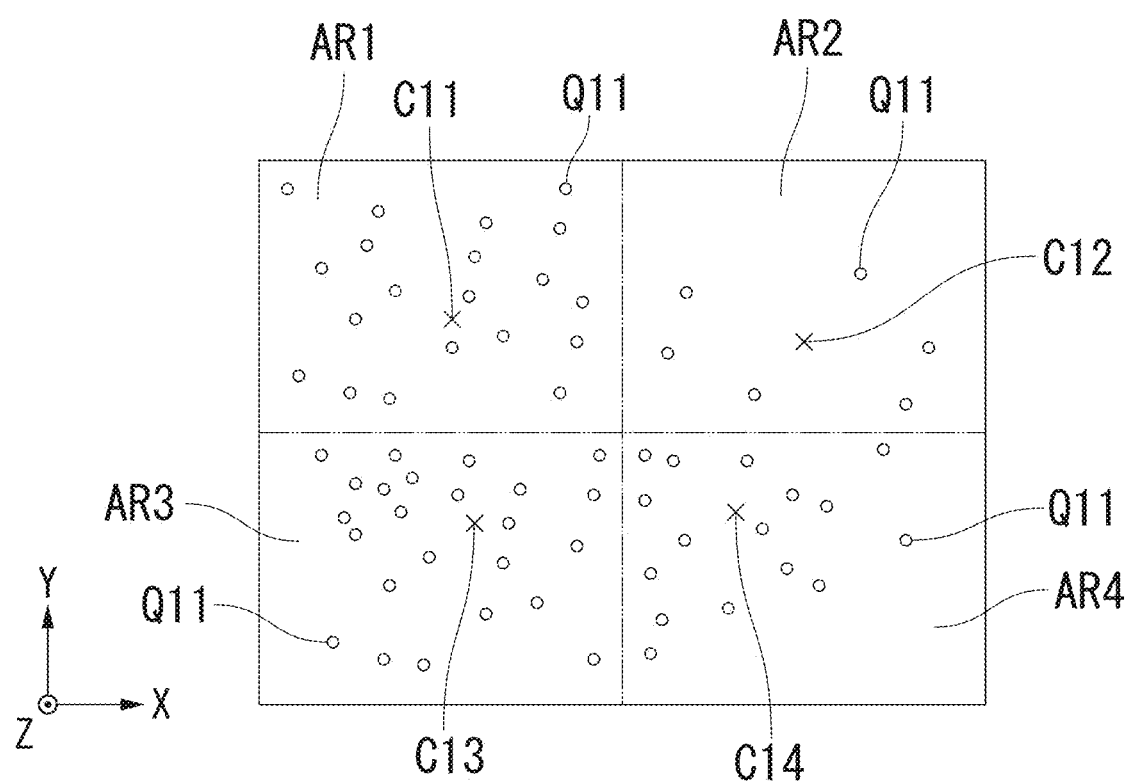
FIGS. 12A to 12C are each includes conceptual diagrams illustrating an example of correction processing by an image processor according to a fourth embodiment.
Figure 12B:
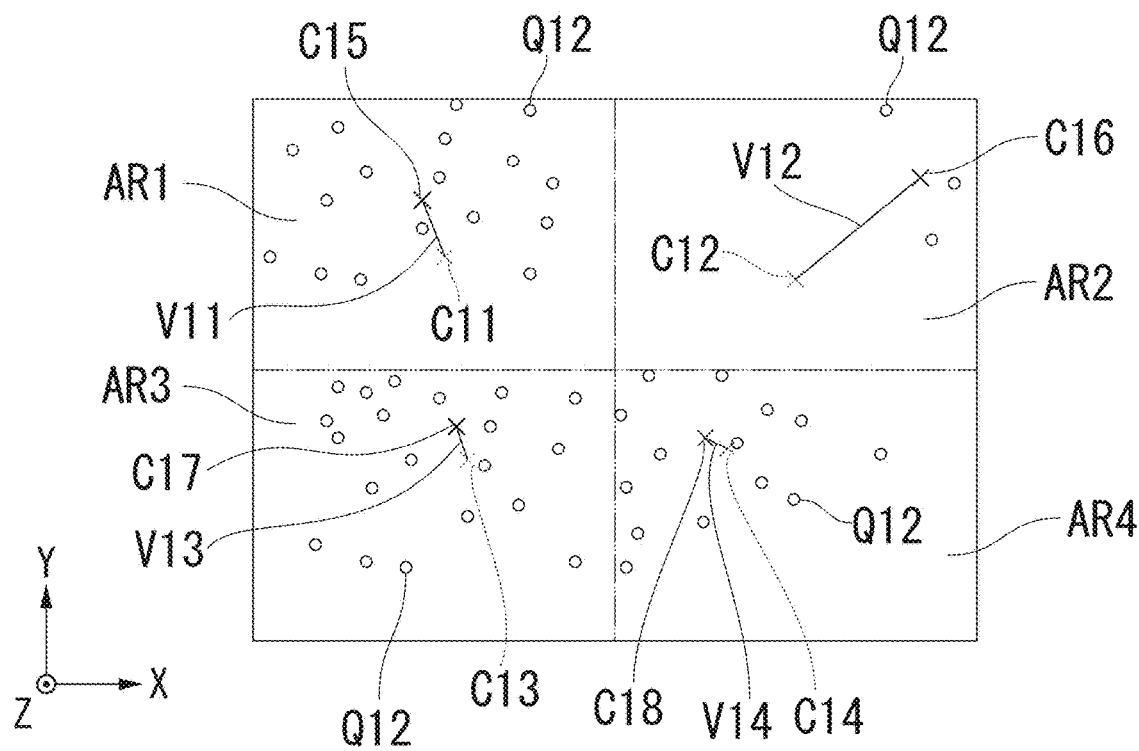
Figure 12C:
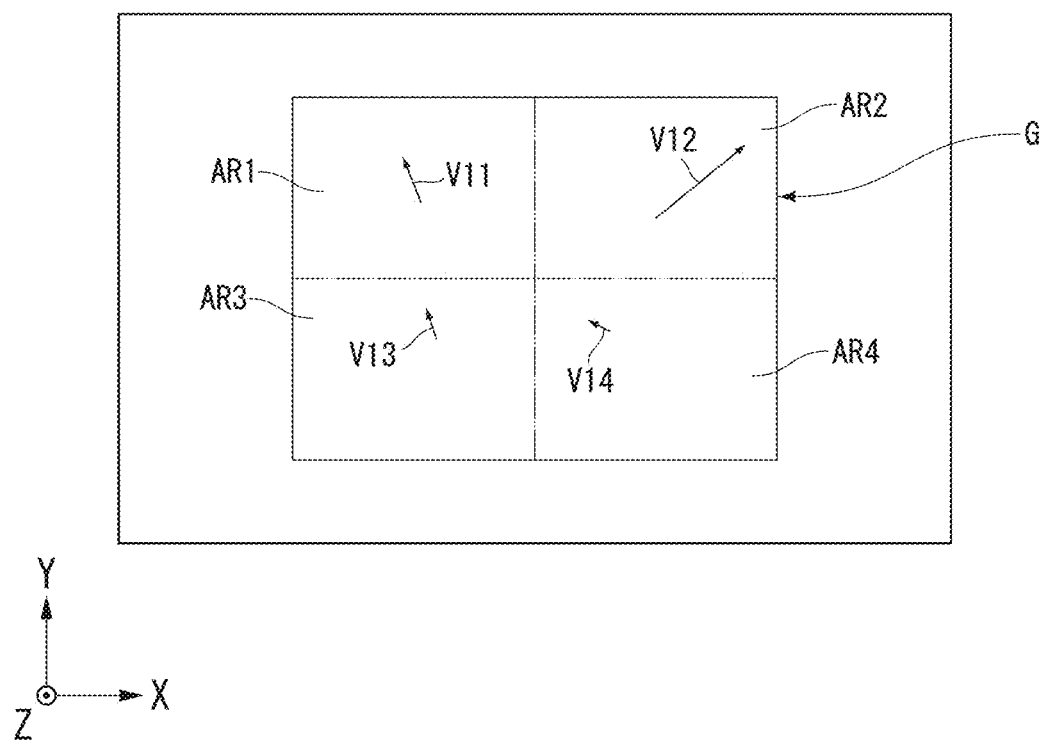

FIGS. 12A to 12C are each includes conceptual diagrams illustrating an example of correction processing by the image processor 7 according to the fourth embodiment. As illustrated in FIG. 12A, the image processor 7 calculates, for a plurality of regions AR1 to AR4, centroid positions C11 to C14 of bright points Q11 in the overlapping region Lm1 between the first layer Lz1 and the second layer Lz2 in the first layer Lz1. As illustrated in FIG. 12B, the image processor 7 calculates, for regions AR1 to AR4, centroid positions C15 to C18 of bright points Q12 in the overlapping region Lm1 between the first layer Lz1 and the second layer Lz2 in the second layer Lz2. The image processor 7 calculates, for the regions AR1 to AR4, vectors V11 to V14 corresponding to the differences between the centroid position of the bright points Q11 and the centroid position of the bright points Q12. The image processor 7 uses vectors obtained by inverting the orientations of the vectors V11 to V14 as correction amounts to correct the positions of bright points Q12 in the regions AR1 to AR4.

The image processor 7 is able to generate an image in which the vectors V11 to V14 corresponding to position shift amounts for the regions AR1 to AR4 are visualized. FIG. 12C is an example of an image G in which the vectors V11 to V14 are visualized. For example, the controller 42 in FIG. 1 displays the image G on the display device 44. While looking at the image G, the user is able to designate a region for correction from among the regions AR1 to AR4. For example, in FIG. 12C, the vector V12 corresponding to a position shift amount in the region AR2 is relatively large, and the user may acquire images again. In FIG. 12C, the case where the image G in which the vectors V11 to V14 are visualized is displayed on the display device 44 is exemplified, but instead, an image in which a region where the position shift amount exceeds a predetermined threshold is displayed in color different from those in other regions may be displayed.

Figure 13A:
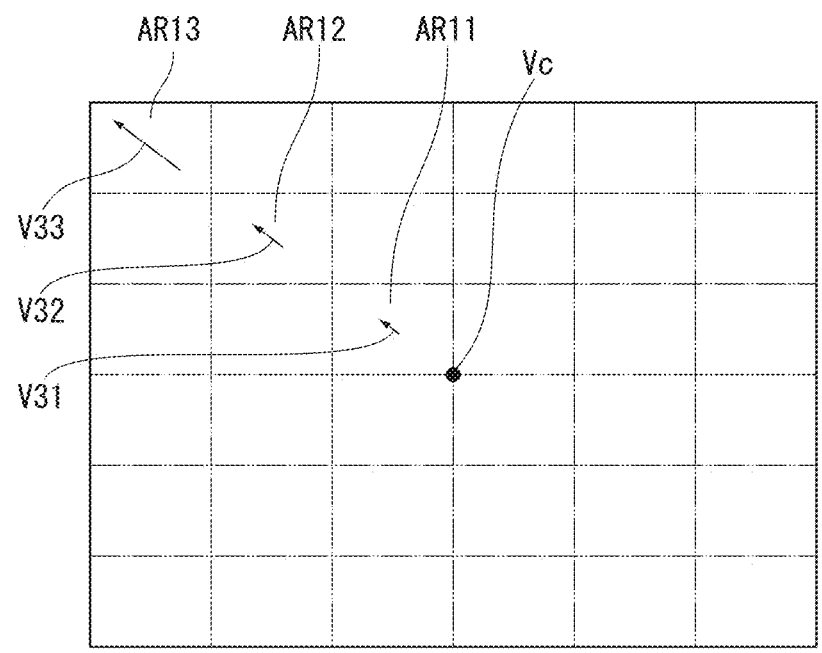
FIGS. 13A and 13B includes conceptual diagrams illustrating another example of the correction processing by the image processor according to the fourth embodiment.
Figure 13B:
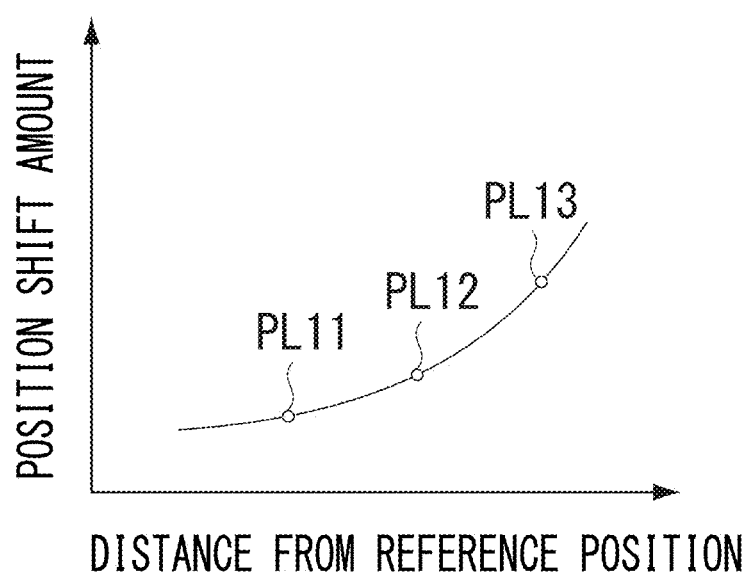

FIGS. 13A and 13B are each includes conceptual diagrams illustrating another example of the correction processing by the image processor 7 according to the fourth embodiment. By using the method described with reference to FIGS. 12A to 12C, the image processor 7 calculates vectors V31 to V33 corresponding to position shift amounts for a plurality of regions AR11 to AR13 in the second layer Lz2. In FIG. 13A, the second layer Lz2 is sectioned into regions in six rows and six columns, and the three regions AR11 to AR13 and the vectors V31 to V33 among the regions are representatively illustrated. The image processor 7 corrects the positions of bright points in the second layer Lz2 based on the relation between a distance from a reference position (for example, visual center Vc) to a reference position in each region (for example, center in each region) and a position shift amount in the region. FIG. 13B is a conceptual diagram illustrating an example of the relation between the distance from the reference position (for example, visual center) and the position shift amount. Symbols PL11, PL12, and PL13 are plots corresponding to respective predetermined positions in the regions AR11 to AR13. For example, the image processor 7 uses the symbols PL11, PL12, and PL13 to calculate the relation between the distance from the visual center and the position shift amount by a formula such as an interpolant or an approximate formula, and uses the formula to calculate a correction amount at each position in the regions AR11 to AR13 in the second layer Lz2. The image processor 7 corrects the positions of the bright points included in the regions AR11 to AR13 based on the calculated correction amount at each position. In FIG. 13B, the position shift amount has a non-linear relation with the distance from the visual center, and the image processor 7 performs non-linear correction. However, linear correction may be performed.

Fifth Embodiment

The following describes a fifth embodiment. In the fifth embodiment, the same configurations as those in the above-mentioned embodiments are denoted with the same reference numerals, and the descriptions thereof are omitted or simplified. In the fifth embodiment, the image processor 7 calculates information (hereinafter referred to as "difference information") indicating a difference between the corrected position of a fluorescent substance included in an overlapping region Lm1 in a second layer Lz2 and the position of the fluorescent substance in the overlapping region Lm1 in a first layer Lz1.

Figure 14A:
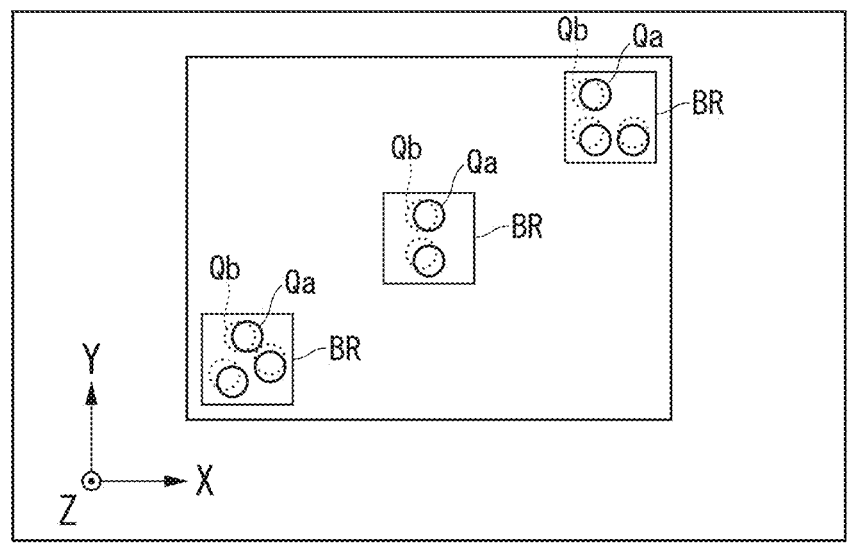
FIGS. 14A to 14C are each includes conceptual diagrams illustrating an example of images displayed on a display device.
Figure 14B:
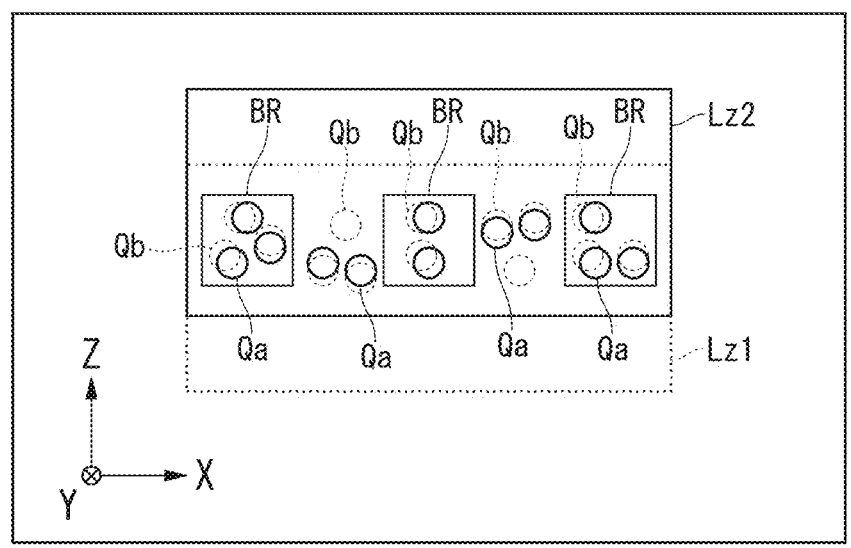
Figure 14C:
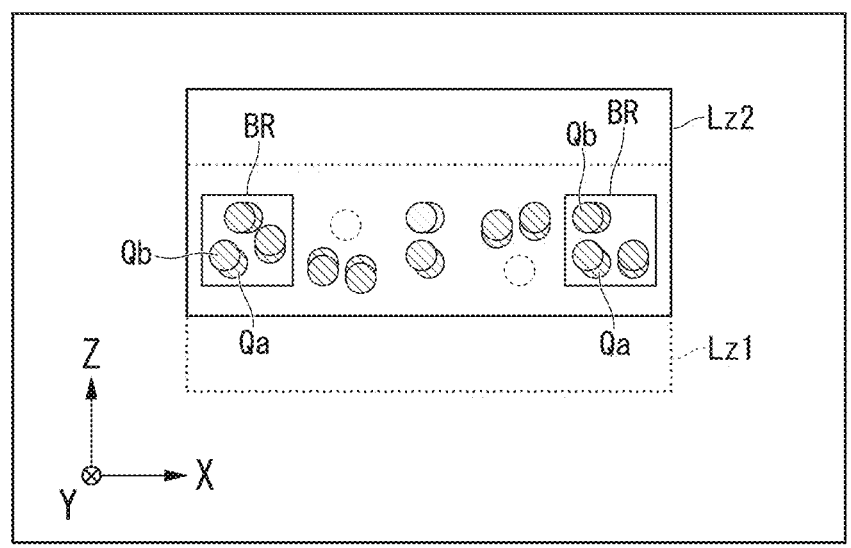

FIGS. 14A to 14C are each includes conceptual diagrams illustrating an example of images displayed on the display device in the fifth embodiment. FIGS. 14A and 14B illustrate the positions of bright points included in an overlapping region Lm1 between a first layer Lz1 and a second layer Lz2. In FIGS. 14A and 14B, symbols Qa are bright points included in the first layer Lz1, and symbols Qb are corrected bright points included in the second layer Lz2. For example, the image processor 7 represents the bright points Qa and the bright points Qb in a region of interest (ROI) BR designated by a user with different colors (for example, bright points Qa are in red and bright points Qb are in blue) or different brightness in a distinguishable manner. The image processor 7 may similarly represent bright points before correction included in the first layer Lz1 and bright points before correction included in the second layer Lz2 with different colors or different brightness. For example, as illustrated in FIG. 14A, the image processor 7 is able to generate an image indicating a distribution of bright points Qa and bright points Qb as seen from the +Z side (from above), and as illustrated in FIG. 14B, able to generate an image indicating a distribution of the bright Points Qa and the bright points Qb as seen from the −Y side (from side). For example, the user is able to grasp the correction results for each region of interest BR by looking at the image indicating the distribution of the bright points Qa and the bright points Qb, and able to determine whether to take an image again. The user is able to grasp whether the correction has succeeded for each region of interest BR, and able to determine whether to change correction conditions and whether to perform correction again.

The image processor 7 is able to calculate a position shift amount between a distribution of bright points Qa and a distribution of bright points Qb in a region of interest BR. For example, the image processor is able to calculate the centroid position of a plurality of the bright points Qa and the centroid position of a plurality of the bright points Qb in the region of interest BR, and calculate the difference therebetween as a position shift amount. For example, a smaller difference of the centroid positions means a smaller shift amount between positions of fluorescent substances included in a first layer Lz1 and corrected positions of fluorescent substances included in a second layer Lz2.

As the position shift amount, a correlation coefficient between a distribution of the bright points Qa and a distribution of the bright points Qb in a region of interest BR may be calculated. For example, a larger correlation coefficient means a smaller shift amount between positions of fluorescent substances included in a first layer Lz1 and corrected positions of fluorescent substances included in a second layer Lz2.

A threshold may be provided to the position shift amount. For example, in a region of interest BR where the position shift amount is equal to or larger than the threshold, bright points Qa and bright points Qb are displayed in different colors (for example, the bright points Qa are in red and the bright points Qb are in blue), and in a region of interest BR where the position shift amount is less than the threshold, the bright points Qa and the bright points Qb may be displayed in the same color (for example, green). For example, in FIG. 14C, hatched bright points are displayed in the same color, and bright points indicated by chain lines are displayed in different colors. In this manner, the user is able to visually grasp the position shift amount for each of a plurality of regions of interest BR.

As the position shift amount, the distance between a bright point Qa and a bright point Qb having a correspondence relation may be calculated. For example, when the distance between a bright point Qa and a bright point Qb having a correspondence relation is less than a threshold, the image processor 7 may display the bright point Qa and the bright point Qb in the same color (for example, green), and when the distance between the bright point Qa and the bright point Qb having a correspondence relation is equal to or more than the threshold, the image processor 7 may display the bright point Qa and the bright point Qb in different colors (for example, the bright point Qa is in red and the bright point Qb is in blue). In this manner, the user is able to visually grasp a position shift amount between a bright point Qa and a bright point Qb in a region of interest BR.

Figure 15:
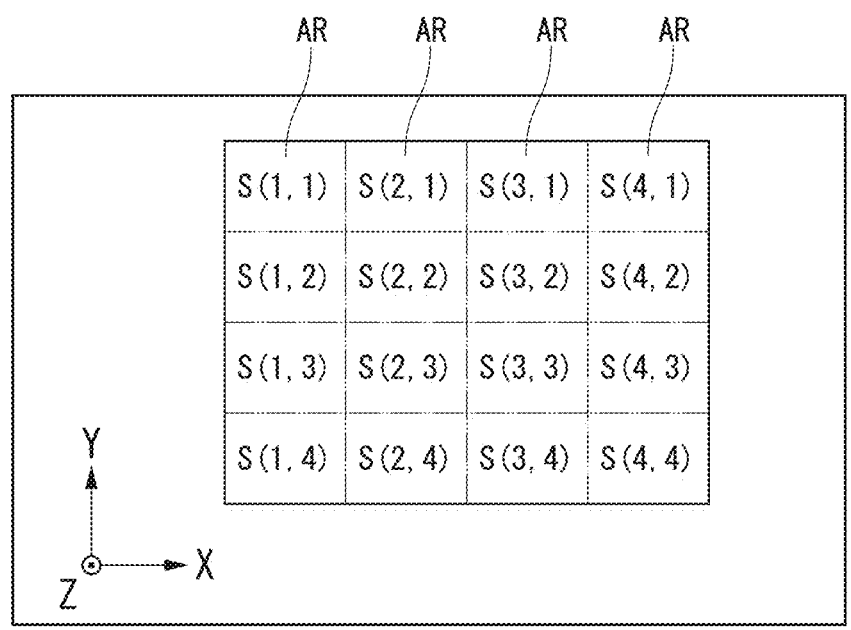
FIG. 15 is an example in which position shift amounts of bright points included in an overlapping region between a first layer and a second layer are quantitatively displayed.

FIG. 15 is an example in which position shift amounts of bright points included in an overlapping region between the first layer Lz1 and the second layer Lz2 are quantitatively displayed. As described above, the image processor 7 calculates, as a position shift amount, an index (for example, difference of centroid positions, correlation coefficient) indicating a position shift amount between a bright point Qa and a bright point Qb for each of a plurality of regions AR. In FIG. 15, the image processor 7 displays an index value (S(1, 1), S(1, 2), . . . ) on the display device 44 for each region. This display enables the user to quantitatively grasp the position shift amounts.

Sixth Embodiment

Figure 16:
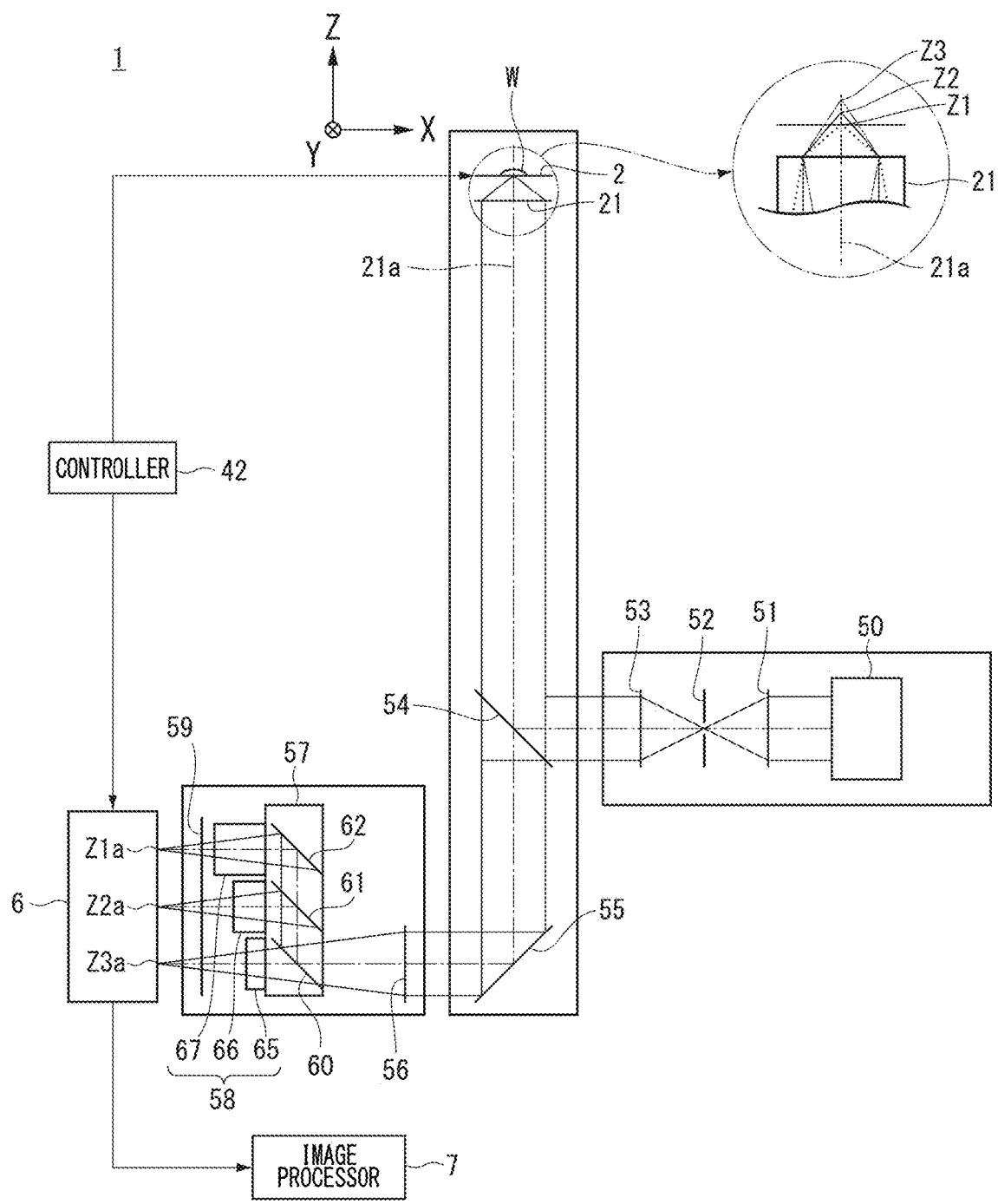
FIG. 16 is a diagram illustrating a microscope according to a sixth embodiment.

The following describes a sixth embodiment. In the sixth embodiment, the same configurations as those in the above-mentioned embodiments are denoted with the same reference numerals, and the descriptions thereof are omitted or simplified. In the above-mentioned embodiments, STORM is described as the microscope 1, but the microscope may be another microscope. FIG. 16 is a diagram illustrating a microscope 1 according to the sixth embodiment. For example, the microscope 1 is obtained by applying a microscope described in WO 2008/069220. The microscope 1 includes, in order from a light source 50 to a specimen W on a stage 2, a lens 51, a field stop 53 (illumination stop), a semitransparent mirror 54, and an objective lens 21. In FIG. 16, the front focus position (Z2) of the objective lens 21 and its neighborhood positions (Z1, Z3) are enlarged. The microscope 1 includes, in the order in which light from the specimen W travels to the imager 6, the objective lens 21, the semitransparent mirror 54, a mirror 55, a lens 56, an optical path brancher 57, an optical path length adjuster 58, and an astigmatic optical system 59.

The optical path brancher 57 includes a semitransparent mirror 60, a semitransparent mirror 61, and a mirror 62. The optical path brancher 57 branches light that has entered the semitransparent mirror 60 into transmitted light and reflected light. The optical path brancher 57 branches light that has been reflected by the semitransparent mirror 60 and entered the semitransparent mirror 61 into transmitted light and reflected light. The optical path length adjuster 58 includes a parallel plate that light that has been transmitted through the semitransparent mirror 60 enters, a parallel plate 66 that light that has been reflected by the semitransparent mirror 61 enters, and a parallel plate 67 that light that has been transmitted through the semitransparent mirror 61 and reflected by the mirror 62 enters. The thicknesses and refractive indices of the parallel plates 65 to 67 are adjusted such that the imaging sensors Z1a, Z2a, and Z3a and the position Z1, the position Z2, and the position Z3 in the Z direction are optically conjugate with each other and that the distance between the position Z1 and the position Z3 becomes a desired distance.

The imager 6 includes a plurality of imaging sensors Z1a, Z2a, and Z3a that are provided on one-to-one correspondence with the respective branched optical paths. Each of the imaging sensors Z1a, Z2a, and Z3a takes an image of light that has passed through a corresponding optical path. The imaging sensors Z1a, Z2a, and Z3a are optically conjugate with the positions Z1, Z2, and Z3 in the Z direction, respectively. The imager 6 is able to collectively take images of light from positions different in the thickness direction in the specimen W by using the imaging sensors. For example, the imaging sensor Z1a acquires an image focused at the position Z1, the imaging sensor Z2a acquires an image focused at the position Z2, and the imaging sensor Z3a acquires an image focused at the position Z3. Specifically, the microscope 1 is able to collectively acquire images of light from positions in the specimen W different in the optical axis direction of the objective lens 21 in the state in which the specimen W and the objective lens 21 are positioned with each other in the optical axis direction. The image processor 7 described in the above-mentioned embodiments is applicable also to this microscope 1.

Figure 17:
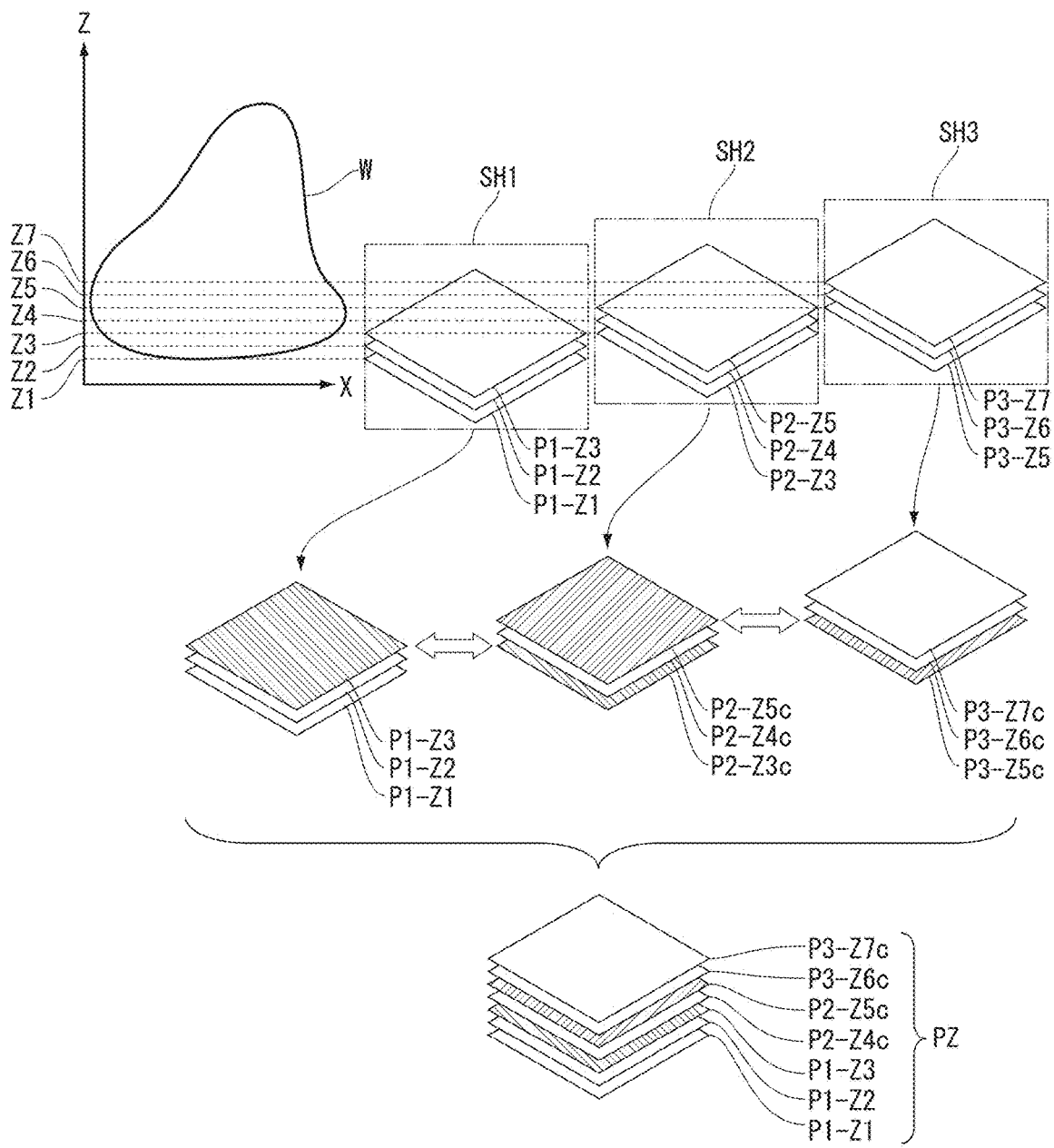
FIG. 17 is a diagram conceptually illustrating an operation of the microscope according to the sixth embodiment.

FIG. 17 is a diagram conceptually illustrating the operation of the microscope 1 according to the sixth embodiment. The controller 42 sets the focus position of the objective lens 21 to a first position, and controls the imager 6 to execute first imaging processing SH1. By the first imaging processing SH1, the imaging sensor Z1a acquires a taken image P1-Z1 focused at the position Z1, the imaging sensor Z2a acquires a taken image P1-Z2 focused at the position Z2, and the imaging sensor Z3a acquires a taken image P1-Z3 focused at the position Z3. Next, the controller 42 sets the focus position of the objective lens to a second position, and controls the imager 6 to execute second imaging processing SH2. By the second imaging processing SH2, the imaging sensor Z1a acquires a taken image P2-Z3 focused at the position Z3, the imaging sensor Z2a acquires a taken image P2-Z4 focused at the position Z4, and the imaging sensor Z3a acquires a taken image P2-Z5 focused at the position Z5. Subsequently, the controller 42 similarly changes the focus position of the objective lens 21, and controls the imager 6 to execute imaging processing. It is assumed that the number of times of the imaging processing is three, but the number of times of the imaging processing is freely set. By third imaging processing SH3, the imaging sensor Z1a acquires a taken image P3-Z5 focused at the position Z5, the imaging sensor Z2a acquires a taken image P3-Z6 focused at the position Z6, and the imaging sensor Z3a acquires a taken image P3-Z7 focused at a position Z7.

The image processor 7 uses the taken images (P1-Z3, P2-Z3) whose positions in the same direction as the optical axis 21a of the objective lens 21 are the same in the first imaging processing SH1 and the second imaging processing SH2 to correct a position shift of the taken images (P2-Z3, P2-Z4, and P2-P5) obtained by the second imaging processing SH2. Through this correction, taken images (P2-Z3c, P2-Z4c, P2-P5c) are obtained. The imaging processor 7 uses, among the corrected taken images (P2-Z3c, P2-Z4c, P2-P5c), the taken images (P2-Z5c, P3-Z5) whose positions in the same direction as the optical axis 21a of the objective lens 21 are the same in the second imaging processing SH2 and the third imaging processing SH3 to correct a position shift of the taken images (P3-Z5, P3-Z6, P3-P7) obtained by the third imaging processing SH3. Through this correction, taken images (P3-Z5c, P2-Z6c, P2-P7c) are obtained. The image processor 7 generates a three-dimensional image PZ by using the taken images (P1-Z1, P1-Z2, P1-P3) obtained by the first imaging processing, the corrected taken images (P2-Z4c, P2-P5c) obtained by the second imaging processing, and the corrected taken images (P2-Z6c, P2-P7c) obtained by the third imaging processing.

Examples of microscopes capable of collectively acquiring images of light from positions of a specimen W different in the optical axis direction of an objective lens 21 in a state in which the specimen W and the objective lens 21 are positioned in the optical axis direction include microscopes described in Literature 1 (Paul A. Dalgarno, Heather I. C. Dalgarno, Aurélie Putoud, Robert Lambert, Lynn Paterson, David C. Logan, David P. Towers Richard J. Warburton, and Alan H. Greenaway, "Multiplane imaging and three dimensional nanoscale particle tracking in biological microscopy", Optics Express Vol. 18, Issue 2, pp. 877-884 (2010)) and Literature 2 (Bassam Hajj, Jan Wisniewski, Mohamed El Beheiry, Jiji Chenb, Andrey Revyakin, Carl Wu, and Maxime Dahan, "Whole-cell, multicolor superresolution imaging using volumetric multifocus microscopy", Proceedings of the National Academy of Sciences of the United States of America, <URL: http://www.pnas.org/content/111/49/17480>). The image processor 7 according to the above-mentioned embodiments is applicable also to such microscopes.

In the above-mentioned embodiments, the control device includes a computer system, for example. The control device 8 reads a computer program stored in the storage device 43, and executes various kinds of processing in accordance with the computer program. For example, the computer program may be an image processing program that causes a computer to execute image processing by using an imaging result obtained by irradiating a specimen including a fluorescent substance with illumination light, forming, by an observation optical system including an objective lens, an image of light from the specimen, moving at least one of a stage to hold the specimen and the objective lens in the same direction as an optical axis of the objective lens, and taking the image formed by the observation optical system. The image processing may include using position information on the fluorescent substance in at least a part of an overlapping region between a first region and a second region from position information on the fluorescent substance in the first region obtained from an imaging result when a focus position of the objective lens is located at a first position and position information on the fluorescent substance in the second region obtained from an imaging result when the focus position of the objective lens is located at a second position, to correct the position information on the fluorescent substance in the second region. In addition, for example, the computer program may be an image processing program that causes a computer to execute image processing by using an imaging result obtained by illuminating a specimen with activation light to activate a part of a fluorescent substance included in the specimen and excitation light to excite at least a part of the activated fluorescent substance, forming, by an observation optical system including an objective lens and an astigmatic optical system that generates astigmatism for at least a part of light from the specimen, an image of light from the specimen, moving at least one of a stage to hold the specimen and the objective lens in the same direction as an optical axis of the objective lens, and taking the image formed by the observation optical system. The image processing may include: calculating position information on the fluorescent substance in a first region by using information related to the astigmatism included in an imaging result obtained when a focus position of the objective lens is located at a first position; calculating position information on the fluorescent substance in a second region by using information related to the astigmatism included in an imaging result obtained when the focus position of the objective lens is located at a second position; and correcting the position information on the fluorescent substance in the second region by using position information on the fluorescent substance in at least a part of an overlapping region between the first region and the second region from the position information on the fluorescent substance in the first region and the position information on the fluorescent substance in the second region. In addition, for example, the computer program may be an image processing program that causes a computer to execute image processing by using an imaging result obtained by irradiating an object placed on a stage with illumination light, forming, by an observation optical system including an objective lens, an image of light from the specimen, moving at least one of the stage and the objective lens in the same direction as an optical axis of the objective lens, and taking the image formed by the observation optical system. The image processing may include using information on the object in at least a part of an overlapping region between a first region and a second region from information on the object in the first region obtained from an imaging result when a focus position of the objective lens is located at a first position and information on the object in the second region obtained from an imaging result when the focus position of the objective lens is located at a second position, to correct the information on the object in the second region. This computer program may be provided by being recorded in a computer-readable storage medium.

The scope of the present invention is not limited to the aspects described according to the above-mentioned embodiments, for example. One or more of the requirements described in the above-mentioned embodiments and the like may be omitted. Note that requirements described in the above-mentioned embodiments and the like may be appropriately combined with one another. To the extent permitted by law, disclosures of all publications cited in the embodiments and the like described herein are hereby incorporated by references in its entirety.

DESCRIPTION OF REFERENCE SIGNS

1 Microscope
4 Illumination optical system
5 First Observation optical system
5a Optical axis
6 Imager
7 Image processor
29 Cylindrical lens (astigmatic optical system)
W Specimen

What is claimed is:

1. A microscope, comprising:
an illumination optical system that irradiates a specimen including a fluorescent substance with illumination light;
an observation optical system that includes an objective lens and forms an image of light from the specimen;
an imager that takes the image formed by the observation optical system;
an image processor; and
a controller that moves at least one of a stage to hold the specimen and the objective lens,
the image processor using first position information on the fluorescent substance in at least a part of an overlapping region between a first three-dimensional region and a second three-dimensional region of the specimen to correct second position information on the fluorescent substance in the second three-dimensional region based on a distance from a reference position in the second three-dimensional region.

2. The microscope according to claim 1, wherein the image processor uses an imaging result of the imager to calculate third position information on the fluorescent substance in the first three-dimensional region of the specimen and the second position information on the fluorescent substance in the second three-dimensional region of the specimen.

3. The microscope according to claim 1, wherein the image processor calculates third position information on the fluorescent substance in the first three-dimensional region by using an imaging result obtained when a focus position of the objective lens is located at a first position, and calculates the second position information on the fluorescent substance in the second three-dimensional region by using an imaging result obtained when the focus position of the objective lens is located at a second position.

4. The microscope according to claim 1, wherein the image processor calculates a correction amount in at least a part of the overlapping region between the first three-dimensional region and the second three-dimensional region by using third position information on the fluorescent substance in the first three-dimensional region and the second position information on the fluorescent substance in the second three-dimensional region, and corrects the second position information on the fluorescent substance in the second three-dimensional region by using the calculated correction amount.

5. The microscope according to claim 1, wherein the image processor calculates correction amounts for a plurality of regions in the overlapping region between the first three-dimensional region and the second three-dimensional region, and corrects the position information on the fluorescent substance.

6. The microscope according to claim 1, wherein the image processor calculates a correction amount in at least a part of the overlapping region between the first three-dimensional region and the second three-dimensional region by using third position information on the fluorescent substance in the first three-dimensional region and the second position information on the fluorescent substance in the second three-dimensional region, and uses the calculated correction amount to calculate a correction amount based on the distance from the reference position in the second three-dimensional region.

7. The microscope according to claim 1, wherein the image processor calculates a correction amount in a designated region in the overlapping region between the first three-dimensional region and the second three-dimensional region.

8. The microscope according to claim 7, wherein the designated region is a region designated based on a distribution of fluorescent substances.

9. The microscope according to claim 7, comprising:
an inputter; and
a display that displays an image indicating third position information on the fluorescent substance in the first three-dimensional region of the specimen and the second position information on the fluorescent substance in the second three-dimensional region of the specimen, wherein
the image processor calculates a correction amount based on information related to a designation of a region input through the inputter in the image displayed on the display.

10. The microscope according to claim 1, wherein
the image processor generates a three-dimensional image by using third position information on the fluorescent substance in the first three-dimensional region and the corrected position information on the fluorescent substance in the second three-dimensional region, and
displays the three-dimensional image on a display.

11. The microscope according to claim 10, wherein the image processor generates the three-dimensional image in which the third position information on the fluorescent substance in the first three-dimensional region and the corrected position information on the fluorescent substance in the second three-dimensional region are represented by points with different colors.

12. The microscope according to claim 10, wherein
the image processor calculates a position shift amount for each of a plurality of regions in the overlapping region by using the third position information on the fluorescent substance in the first three-dimensional region and the corrected position information on the fluorescent substance in the second three-dimensional region, and
the image processor generates the three-dimensional image in which the third position information on the fluorescent substance in the first three-dimensional region and the corrected position information on the fluorescent substance in the second three-dimensional region are represented by points with a same color in the region where the position shift amount is less than the threshold, the image processor generates the three-dimensional image in which the third position information on the fluorescent substance in the first three-dimensional region and the corrected position information on the fluorescent substance in the second three-dimensional region are represented by points with different colors in the region where the position shift amount is equal to or more than the threshold.

13. The microscope according to claim 1, wherein
the image processor generates a three-dimensional image by using third position information on the fluorescent substance in the first three-dimensional region in the overlapping region and the corrected position information on the fluorescent substance in the second three-dimensional region in the overlapping region, and
displays the generated three-dimensional image of the overlapping region on a display.

14. The microscope according to claim 13, wherein the image processor generates the three-dimensional image in which the third position information on the fluorescent substance in the first three-dimensional region and the corrected position information on the fluorescent substance in the second three-dimensional region are represented by points with different colors.

15. The microscope according to claim 13, wherein
the image processor calculates a position shift amount for each of a plurality of regions in the overlapping region by using the third position information on the fluorescent substance in the first three-dimensional region and the corrected position information on the fluorescent substance in the second three-dimensional region, and
the image processor generates the three-dimensional image in which the third position information on the fluorescent substance in the first three-dimensional region and the corrected position information on the fluorescent substance in the second three-dimensional region are represented by points with a same color in the region where the position shift amount is less than the threshold, the image processor generates the three-dimensional image in which the third position information on the fluorescent substance in the first three-dimensional region and the corrected position information on the fluorescent substance in the second three-dimensional region are represented by points with different colors in the region where the position shift amount is equal to or more than the threshold.

16. A microscope, comprising:
a first illumination optical system that illuminates a specimen with activation light to activate a part of a fluorescent substance included in the specimen;
a second illumination optical system that illuminates the specimen with excitation light to excite at least a part of the activated fluorescent substance; and
an observation optical system that includes: an objective lens; and an astigmatic optical system that generates astigmatism for at least a part of light from the specimen, the observation optical system forming an image of light from the specimen;
an imager that takes the image formed by the observation optical system;
an image processor; and
a controller that moves at least one of a stage to hold the specimen and the objective lens,
the image processor using first position information on the fluorescent substance in at least a part of an overlapping region between a first three-dimensional region and a second three-dimensional region of the specimen to correct second position information on the fluorescent substance in the second three-dimensional region based on a distance from a reference position in the second three-dimensional region.

17. The microscope according to claim 16, wherein the image processor uses an imaging result of the imager to calculate third position information on the fluorescent substance in the first three-dimensional region of the specimen and the second position information on the fluorescent substance in the second three-dimensional region of the specimen.

18. The microscope according to claim 16, wherein the image processor calculates third position information on the fluorescent substance in the first three-dimensional region by using an imaging result obtained when a focus position of the objective lens is located at a first position, and calculates the second position information on the fluorescent substance in the second three-dimensional region by using an imaging result obtained when the focus position of the objective lens is located at a second position.

19. The microscope according to claim 16, wherein the image processor calculates a correction amount in at least a part of the overlapping region between the first three-dimensional region and the second three-dimensional region by using third position information on the fluorescent substance in the first three-dimensional region and the second position information on the fluorescent substance in the second three-dimensional region, and corrects the second position information on the fluorescent substance in the second three-dimensional region by using the calculated correction amount.

20. The microscope according to claim 16, wherein the image processor calculates correction amounts for a plurality of regions in the overlapping region between the first three-dimensional region and the second three-dimensional region, and corrects the position information on the fluorescent substance.

21. The microscope according to claim 16, wherein the image processor calculates a correction amount in at least a part of the overlapping region between the first three-dimensional region and the second three-dimensional region by using third position information on the fluorescent substance in the first three-dimensional region and the second position information on the fluorescent substance in the second three-dimensional region, and uses the calculated correction amount to calculate a correction amount based on the distance from the reference position in the second three-dimensional region.

22. The microscope according to claim 16, wherein the image processor calculates a correction amount in a designated region in the overlapping region between the first three-dimensional region and the second three-dimensional region.

23. The microscope according to claim 22, wherein the designated region is a region designated based on a distribution of fluorescent substances.

24. The microscope according to claim 22, comprising:
an inputter; and
a display that displays an image indicating third position information on the fluorescent substance in the first three-dimensional region of the specimen and the second position information on the fluorescent substance in the second three-dimensional region of the specimen, wherein
the image processor calculates a correction amount based on information related to a designation of a region input through the inputter in the image displayed on the display.

25. The microscope according to claim 16, wherein
the image processor generates a three-dimensional image by using third position information on the fluorescent substance in the first three-dimensional region and the corrected position information on the fluorescent substance in the second three-dimensional region, and
displays the three-dimensional image on a display.

26. The microscope according to claim 25, wherein the image processor generates the three-dimensional image in which the third position information on the fluorescent substance in the first three-dimensional region and the corrected position information on the fluorescent substance in the second three-dimensional region are represented by points with different colors.

27. The microscope according to claim 25, wherein
the image processor calculates a position shift amount for each of a plurality of regions in the overlapping region by using the third position information on the fluorescent substance in the first three-dimensional region and the corrected position information on the fluorescent substance in the second three-dimensional region, and
the image processor generates the three-dimensional image in which the third position information on the fluorescent substance in the first three-dimensional region and the corrected position information on the fluorescent substance in the second three-dimensional region are represented by points with a same color in the region where the position shift amount is less than the threshold, the image processor generates the three-dimensional image in which the third position information on the fluorescent substance in the first three-dimensional region and the corrected position information on the fluorescent substance in the second three-dimensional region are represented by points with different colors in the region where the position shift amount is equal to or more than the threshold.

28. The microscope according to claim 16, wherein
the image processor generates a three-dimensional image by using third position information on the fluorescent substance in the first three-dimensional region in the overlapping region and the corrected position information on the fluorescent substance in the second three-dimensional region in the overlapping region, and
displays the generated three-dimensional image of the overlapping region on a display.

29. The microscope according to claim 28, wherein the image processor generates the three-dimensional image in which the third position information on the fluorescent substance in the first three-dimensional region and the corrected position information on the fluorescent substance in the second three-dimensional region are represented by points with different colors.

30. The microscope according to claim 28, wherein
the image processor calculates a position shift amount for each of a plurality of regions in the overlapping region by using the third position information on the fluorescent substance in the first three-dimensional region and the corrected position information on the fluorescent substance in the second three-dimensional region, and
the image processor generates the three-dimensional image in which the third position information on the fluorescent substance in the first three-dimensional region and the corrected position information on the fluorescent substance in the second three-dimensional region are represented by points with a same color in the region where the position shift amount is less than the threshold, the image processor generates the three-dimensional image in which the third position information on the fluorescent substance in the first three-dimensional region and the corrected position information on the fluorescent substance in the second three-dimensional region are represented by points with different colors in the region where the position shift amount is equal to or more than the threshold.

31. The microscope according to claim 16, wherein the first illumination optical system and the second illumination optical system are at least partially shared.

32. A microscope, comprising:
an illumination optical system that irradiates an object placed on a stage with illumination light;

an observation optical system that includes an objective lens and forms an image of light from the object;
an imager that takes the image formed by the observation optical system;
an image processor; and
a controller that moves at least one of the stage and the objective lens,
the image processor using first information on the object in at least a part of an overlapping region between a first three-dimensional region and a second three-dimensional region of the object to correct second information on the object in the second three-dimensional region based on a distance from a reference position in the second three-dimensional region.

33. The microscope according to claim 32, wherein the image processor uses an imaging result of the imager to calculate third information on the object in the first three-dimensional region of the object and the second information on the object in the second three-dimensional region of the object.

34. The microscope according to claim 32, wherein the image processor calculates third information on the object in the first three-dimensional region by using an imaging result obtained when a focus position of the objective lens is located at a first position, and calculates the second information on the object in the second three-dimensional region by using an imaging result obtained when the focus position of the objective lens is located at a second position.

35. The microscope according to claim 32, wherein the image processor calculates a correction amount in at least a part of the overlapping region between the first three-dimensional region and the second three-dimensional region by using third information on the object in the first three-dimensional region and the information on the object in the second three-dimensional region, and corrects the second information on the object in the second three-dimensional region by using the calculated correction amount.

36. The microscope according to claim 32, wherein the image processor calculates correction amounts for a plurality of regions in the overlapping region between the first three-dimensional region and the second three-dimensional region, and corrects the information on the object.

37. The microscope according to claim 32, wherein the image processor calculates a correction amount in at least a part of the overlapping region between the first three-dimensional region and the second three-dimensional region by using third information on the object in the first three-dimensional region and the information on the object in the second three-dimensional region, and uses the calculated correction amount to calculate a correction amount based on the distance from the reference position in the second three-dimensional region.

38. The microscope according to claim 32, wherein the image processor calculates a correction amount in a designated region in the overlapping region between the first three-dimensional region and the second three-dimensional region.

39. The microscope according to claim 38, wherein the designated region is a region designated based on a distribution of objects.

40. The microscope according to claim 38, comprising:
an inputter; and
a display that displays an image indicating third information on the object in the first three-dimensional region of the specimen and the second information on the object in the second three-dimensional region of the specimen, wherein the image processor calculates a correction amount based on information related to a designation of a region input through the inputter in the image displayed on the display.

41. The microscope according to claim 32, wherein
the image processor generates a three-dimensional image by using third information on the object in the first three-dimensional region and the corrected information on the object in the second three-dimensional region, and
displays the three-dimensional image on a display.

42. The microscope according to claim 41, wherein the image processor generates the three-dimensional image in which the third information on the object in the first three-dimensional region and the second information on the object in the second three-dimensional region are represented by points with different colors.

43. The microscope according to claim 41, wherein
the image processor calculates a position shift amount for each of a plurality of regions in the overlapping region by using the third information on the object in the first three-dimensional region and the corrected information on the object in the second three-dimensional region, and
the image processor generates the three-dimensional image in which the third information on the object in the first three-dimensional region and the corrected information on the object in the second three-dimensional region are represented by points with a same color in the region where the position shift amount is less than the threshold, and the image processor generates the three-dimensional image in which the third information on the object in the first three-dimensional region and the corrected information on the object in the second three-dimensional region are represented by points with different colors in the region where the position shift amount is equal to or more than the threshold.

44. The microscope according to claim 32, wherein
the image processor generates a three-dimensional image by using third information on the object in the first three-dimensional region in the overlapping region and the corrected information on the object in the second three-dimensional region in the overlapping region, and
displays the generated three-dimensional image in the overlapping region on a display.

45. The microscope according to claim 44, wherein the image processor generates the three-dimensional image in which the third information on the object in the first three-dimensional region and the second information on the object in the second three-dimensional region are represented by points with different colors.

46. The microscope according to claim 44, wherein
the image processor calculates a position shift amount for each of a plurality of regions in the overlapping region by using the third information on the object in the first three-dimensional region and the corrected information on the object in the second three-dimensional region, and
the image processor generates the three-dimensional image in which the third information on the object in the first three-dimensional region and the corrected information on the object in the second three-dimensional region are represented by points with a same color in the region where the position shift amount is less than the threshold, and the image processor generates the three-dimensional image in which the third information on the object in the first three-dimensional region and the corrected information on the object in the second three-dimensional region are represented by points with different colors in the region where the position shift amount is equal to or more than the threshold.

47. An observation method, comprising:
irradiating a specimen including a fluorescent substance with illumination light;
forming, by an observation optical system including an objective lens, an image of light from the specimen;
taking the image formed by the observation optical system;
performing image processing; and
moving at least one of a stage to hold the specimen and the objective lens,
the image processing comprising using first position information on the fluorescent substance in at least a part of an overlapping region between a first three-dimensional region and a second three-dimensional region of the specimen to correct second position information on the fluorescent substance in the second three-dimensional region based on a distance from a reference position in the second three-dimensional region.

48. An observation method, comprising:
illuminating a specimen with activation light to activate a part of a fluorescent substance included in the specimen and excitation light to excite at least a part of the activated fluorescent substance;
forming, by an observation optical system including an objective lens and an astigmatic optical system that generates astigmatism for at least a part of light from the specimen, an image of light from the specimen;
taking the image formed by the observation optical system;
performing image processing; and
moving at least one of a stage to hold the specimen and the objective lens,
the image processing comprising using first position information on the fluorescent substance in at least a part of an overlapping region between a first three-dimensional region and a second three-dimensional region of the specimen to correct second position information on the fluorescent substance in the second three-dimensional region based on a distance from a reference position in the second three-dimensional region.

49. An observation method, comprising:
irradiating an object placed on a stage with illumination light;
forming, by an observation optical system including an objective lens, an image of light from the object;
taking the image formed by the observation optical system;
performing image processing; and
moving at least one of the stage and the objective lens,
the image processing comprising using first information on the object in at least a part of an overlapping region between a first three-dimensional region and a second three-dimensional region of the object to correct second information on the object in the second three-dimensional region based on a distance from a reference position in the second three-dimensional region.

50. A storage medium storing therein an image processing program causing a computer to execute image processing by using an imaging result of an imager obtained by irradiating a specimen including a fluorescent substance with illumination light, forming, by an observation optical system including an objective lens, an image of light from the specimen, taking the image by the imager, and moving at least one of a stage to hold the specimen and the objective lens,
the image processing comprising using first position information on the fluorescent substance in at least a part of an overlapping region between a first three-dimensional region and a second three-dimensional region of the specimen to correct second position information on the fluorescent substance in the second three-dimensional region based on a distance from a reference position in the second three-dimensional region.

51. A storage medium storing therein an image processing program causing a computer to execute image processing by using a result of imaging by an imager obtained by illuminating a specimen with activation light to activate a part of a fluorescent substance included in the specimen and excitation light to excite at least a part of the activated fluorescent substance, forming, by an observation optical system that includes an objective lens and an astigmatic optical system that generates astigmatism for at least a part of light from the specimen, an image of light from the specimen, taking the image by the imager, and moving at least one of a stage to hold the specimen and the objective lens,
the image processing comprising using first position information on the fluorescent substance in at least a part of an overlapping region between a first three-dimensional region and a second three-dimensional region of the specimen to correct second position information on the fluorescent substance in the second three-dimensional region based on a distance from a reference position in the second three-dimensional region.

52. A storage medium storing therein an image processing program causing a computer to execute image processing by using a result of imaging by an imager obtained by irradiating an object placed on a stage with illumination light, forming, by an observation optical system including an objective lens, an image of light from the object, taking the image by the imager, and moving at least one of the stage and the objective lens,
the image processing comprising using first information on the object in at least a part of an overlapping region between a first three-dimensional region and a second three-dimensional region of the object to correct second information on the object in the second three-dimensional region based on a distance from a reference position in the second three-dimensional region.

* * * * *